United States Patent
Fukumoto

(10) Patent No.: US 7,489,345 B2
(45) Date of Patent: Feb. 10, 2009

(54) IMAGE PROCESSING APPARATUS, IMAGE-TAKING SYSTEM, IMAGE PROCESSING METHOD AND IMAGE PROCESSING PROGRAM

(75) Inventor: Toshihiro Fukumoto, Tochigi (JP)

(73) Assignee: Canon Kabushiki Kaisha, Tokyo (JP)

( * ) Notice: Subject to any disclaimer, the term of this patent is extended or adjusted under 35 U.S.C. 154(b) by 813 days.

(21) Appl. No.: 10/975,620

(22) Filed: Oct. 29, 2004

(65) Prior Publication Data
US 2005/0093992 A1     May 5, 2005

(30) Foreign Application Priority Data

| Oct. 31, 2003 | (JP) | ............................ 2003-373635 |
| Dec. 1, 2003 | (JP) | ............................ 2003-401729 |

(51) Int. Cl.
*H04N 5/228* (2006.01)
(52) U.S. Cl. ............................. 348/222.1; 382/274.167
(58) Field of Classification Search ............. 348/231.6, 348/22.1, 222.1, 246, 335, 364; 382/167, 382/274
See application file for complete search history.

(56) References Cited

U.S. PATENT DOCUMENTS

| 5,623,365 | A | 4/1997 | Kube | ......................... 359/569 |
| 5,790,321 | A | 8/1998 | Goto | ......................... 359/742 |
| 6,088,059 | A * | 7/2000 | Mihara et al. | ............... 348/335 |
| 6,452,635 | B1 | 9/2002 | Tanaka | ....................... 348/342 |
| 6,597,401 | B1 | 7/2003 | Maruyama | ................... 348/335 |
| 6,912,321 | B2 * | 6/2005 | Gindele | ....................... 382/274 |
| 2004/0105014 | A1 * | 6/2004 | Yamamoto et al. | ........ 348/222.1 |
| 2005/0094896 | A1 * | 5/2005 | Masumura et al. | ........... 382/276 |

FOREIGN PATENT DOCUMENTS

| JP | 4-9803 | 1/1992 |
| JP | 6-324262 | 11/1994 |
| JP | 6-331941 | 12/1994 |
| JP | 9-238357 | 9/1997 |
| JP | 11-122539 | 4/1999 |
| JP | 2000-333076 | 11/2000 |
| WO | 94/15184 | 7/1994 |

* cited by examiner

*Primary Examiner*—David L Ometz
*Assistant Examiner*—Ahmed A Berhan
(74) *Attorney, Agent, or Firm*—Fitzpatrick, Cella, Harper & Scinto

(57) ABSTRACT

An image processing apparatus is disclosed which can provide a high-quality image by specifying an image corresponding to an image resulting from non-image forming light in image information obtained by taking an image of an object having a high brightness and conducting image processing to make the image difficult to recognize visually. The image processing apparatus processes image information which includes a first image component which was responsive to an image-forming light and a second image component which was responsive to a non-image forming light. The image processing apparatus has an image acquiring section which acquires the image information and an edge processing section which conducts edge processing with respect to the image information to distinguish the second image component with respect to the first image component.

15 Claims, 27 Drawing Sheets

FIG.5B PROCESSING TO DETECT PRESENCE OR ABSENCE OF FLARE
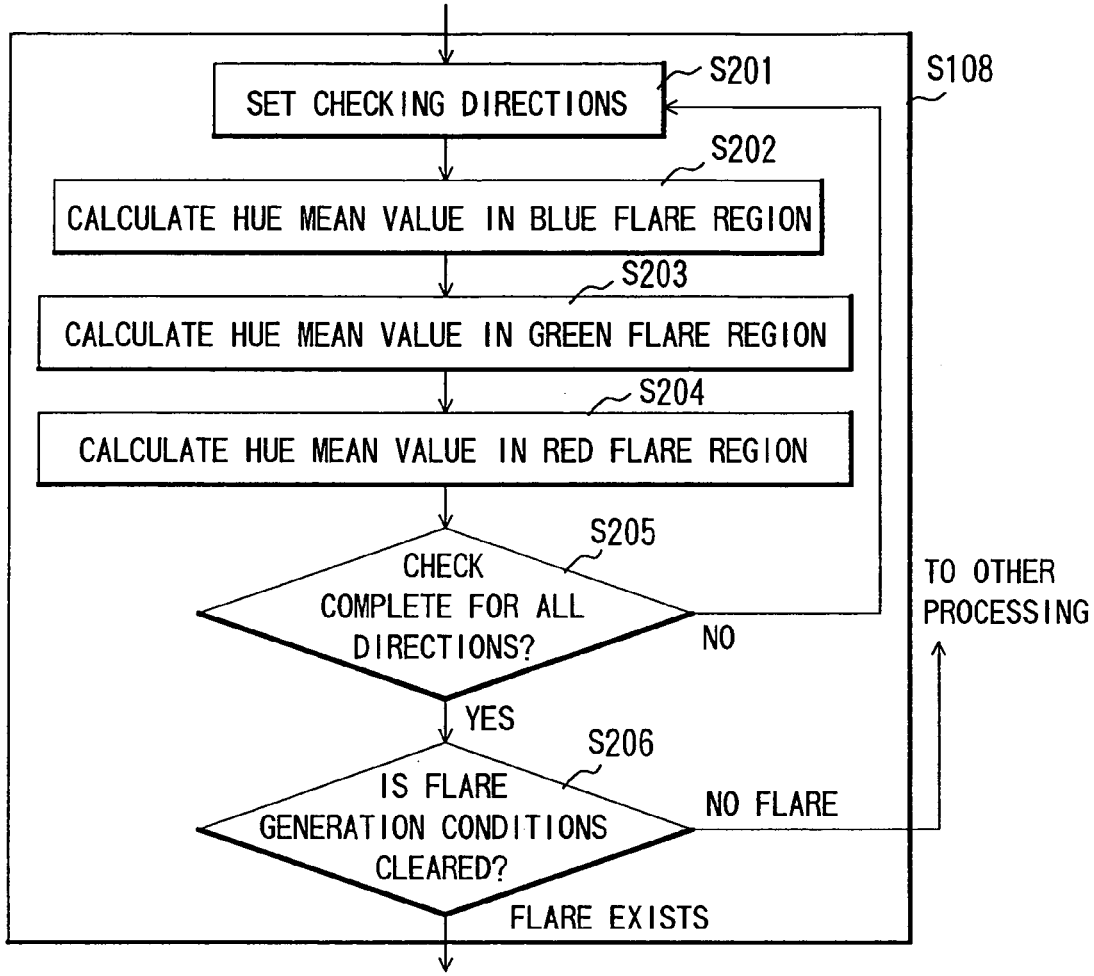
CALCULATION OF FLARE GENERATION REGIONS
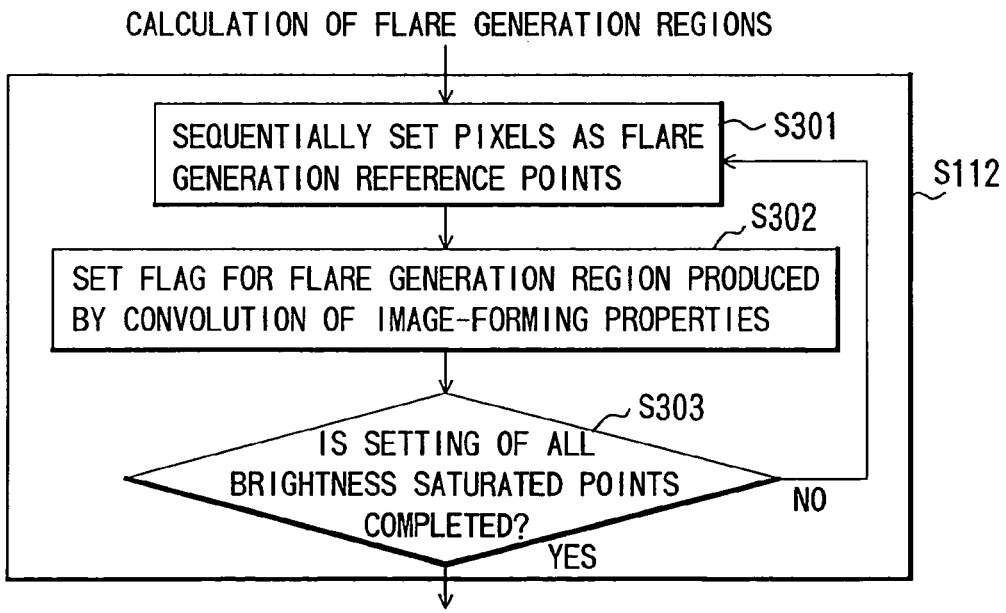

IMAGE AFTER EDGE PROCESSING OF 0, 2-ORDER DIFFRACTED LIGHT

BRIGHTNESS CROSS-SECTION OF EACH COLOR SPECIFICATION SYSTEM OF IMAGE AFTER EDGE PROCESSING OF 0, 2-ORDER DIFFRACTED LIGHT

HUE IMAGE AFTER EDGE PROCESSING OF 0, 2-ORDER DIFFRACTED LIGHT

BRIGHTNESS CROSS-SECTION OF HUE IMAGE AFTER EDGE PROCESSING OF 0, 2-ORDER DIFFRACTED LIGHT

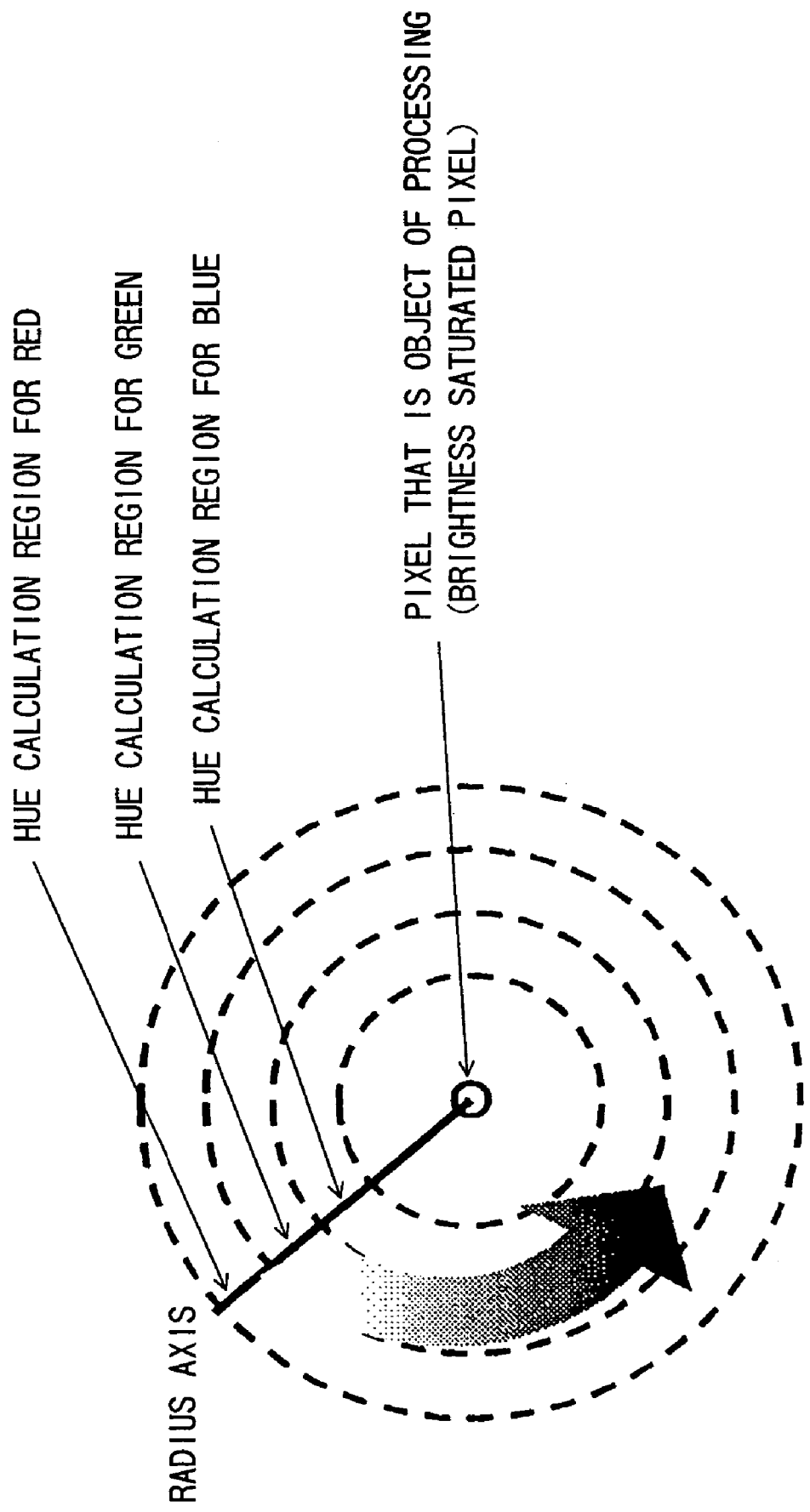

PIXEL THAT IS REFERENCE POINT FOR FLARE GENERATION RESULTING FROM UNWANTED DIFFRACTED LIGHT

REGION OF 0, 2-ORDER FLARE IMAGE-FORMING PROPERTIES

REGION OF FLARE GENERATION RESULTING FROM UNWANTED DIFFRACTED LIGHT

OFF AXIS

ON AXIS

FIG.23
| R | | R | | R |
|---|---|---|---|---|
| | | | | |
| R | | R | | R |
| | | | | |
| R | | R | | R |
| | G | | G | | G |
|---|---|---|---|---|---|
| G | | G | | G | |
| | G | | G | | G |
| G | | G | | G | |
| | G | | G | | G |
| G | | G | | G | |
| | B | | B | | B |
|---|---|---|---|---|---|
| | | | | | |
| | B | | B | | B |
| | | | | | |
| | B | | B | | B |
FIG.24A
ON AXIS
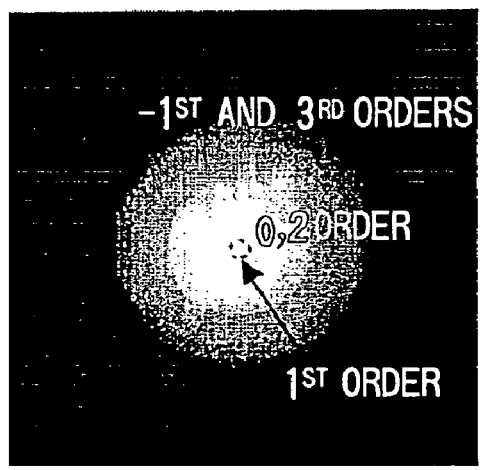
FIG.24B
OFF AXIS
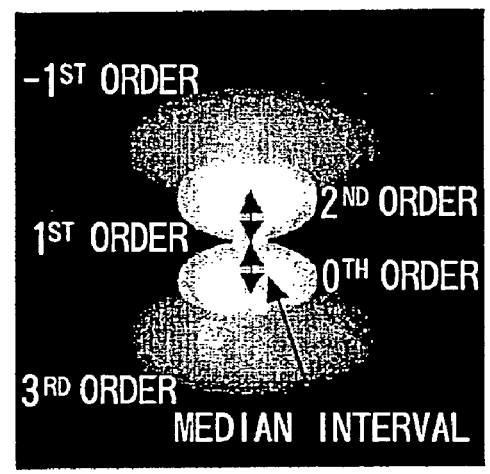

IMAGE PROCESSING APPARATUS, IMAGE-TAKING SYSTEM, IMAGE PROCESSING METHOD AND IMAGE PROCESSING PROGRAM

BACKGROUND OF THE INVENTION

1. Field of the Invention

The present invention relates to processing technology for image information which includes a first image component which was responsive to an image-forming light and a second image component which was responsive to a non-image forming light, and more specifically to image processing technology to make a second image component inconspicuous.

2. Description of the Related Art

Optical elements which have a diffractive surface (diffractive optical elements) are elements which actively utilize the diffraction effect of light, and have an action which separates light that is incident on the diffractive optical element into a variety of diffraction orders or an action which condenses only light of a predetermined diffraction order, and the like.

For example, characteristics of a diffractive optical element designed to have a condensing action include a small thickness, a capability of generating an aspherical wave, and a dispersion of a negative value in the lens design. Therefore, although compact, it is useful for correcting an aberration in an optical system, and has an advantage of being able to obtain a so-called "achromatic effect."

Light which is incident on a diffractive optical element is separated into diffracted light of a plurality of orders. Only one of these components is used in image formation, that is, there is only one image-forming order, and the components of the other orders exist as unwanted diffraction-order light (hereunder, referred to as "unwanted diffracted light") which have a focal point in a position which is different to that of the image-forming order component and are present as flare on an image surface.

Therefore, although there are cases where a contrivance is devised whereby a diffractive surface is rendered serrate to condense light only in an image-forming order, it is difficult to suppress unwanted diffracted light across an entire visible light region. Accordingly, the practical application thereof as an element which comprises an image-taking optical system such as a camera lens has been difficult.

To overcome this problem, as shown in FIG. 1, a technique has been proposed which reduces the diffraction efficiency of unwanted orders significantly more than the conventional monolayer-type diffractive optical elements by superimposing diffractive optical elements 201 and 202 which have respective diffractive surfaces 201a and 202a. By use of this layer-type diffractive optical element (DO lens) 200, it is possible to produce a compact camera lens which maintains high image formation performance while favorably correcting chromatic aberration.

However, even when using a DO lens, when taking an image of an object of an extremely intense brightness (luminous energy), the intensity of unwanted diffracted light is raised by the intense brightness and results in a large intensity. For example, in a given DO lens, as shown in FIG. 2, the image-forming properties of diffraction order light rays (hereunder, referred to as "image-forming diffracted light") used for image formation with respect to the highest brightness value of the image-forming properties of unwanted diffracted light is taken as 10000:1. In the case of using this lens when installed in a camera that is capable of acquiring an 8-bit digital image and taking an image of a point source of light in a dark room, when exposure is set such that an image produced by image-forming diffracted light is taken within the range of 8 bits, the highest brightness of flare produced by unwanted diffracted light is 256/10000=0.0256, and flare hardly appears in the image that is taken.

However, when the exposure is increased 10000-fold, the brightness of pixels which correspond to an image produced by image-forming diffracted light is completely saturated, and the highest brightness of flares produced by unwanted diffracted light becomes 256, such that, as shown in FIG. 3, the flares form an image that is clearly distinguishable in regions in which the flares do not overlap with the image produced by the image-forming diffracted light.

Thus, depending on the image-taking environment, the occurrence of flare images due to unwanted diffracted light is an unavoidable phenomenon.

Meanwhile, in a digital image-taking apparatus such as a digital camera, image information of an object image acquired by a photoelectric conversion element such as a CCD or CMOS is subjected to image processing which converts the image information into a visually acceptable image.

In Japanese Patent Laid-Open No. H09-238357 and Japanese Patent Laid-Open No. H11-122539 a technique is proposed which corrects flare produced by unwanted diffracted light in a digital image-taking apparatus which uses an optical system which has a diffractive surface. The technique involves calculating as flare images, flare components produced by unwanted diffracted light generated by a diffractive surface in a taken image, by multiplying image-forming properties of unwanted diffraction orders in that image by a diffraction efficiency weighting and subtracting the result from the taken image, to bring the taken image itself close to the component for the object image.

However, in a practical DO lens, the image-forming order is sufficiently larger than the diffraction efficiency of unwanted orders, and thus unwanted diffracted light does not become visually noticeable in a taken image at a brightness where the brightness of an image produced by the image-forming order is not saturated. Therefore, the technology proposed in the above publications is meaningless when using a practical DO lens for this type of image-taking.

Moreover, when flare resulting from unwanted diffracted light appears in a taken image even when using a practical DO lens, it indicates that the brightness of the image produced by the image-forming light is definitely saturated. Thus, even if the technique proposed in the aforementioned patent literature is used, since the object image component itself cannot be accurately obtained because of brightness saturation, a flare component that is to be corrected cannot be estimated.

Further, in Japanese Patent Laid-Open No. 11-122539 a technique is proposed for cases in which the above kind of brightness saturation occurs which calculates an object image component on the basis of a taken image in which brightness is not saturated, by conducting almost simultaneous image-taking of an object a plurality of times at different exposures. However, in practice it is extremely difficult to conduct image-taking almost simultaneously a plurality of times in a state where there is no means to know what level of exposure to use to suppress brightness saturation, and in particular, it is not a useful means for a moving object. There is also a possibility that the exposure set in the image-taking apparatus will not be capable of suppressing brightness saturation.

Because of the above problems, for images which include highlights to the extent that unwanted diffracted light constitutes a problem, in reality it is not possible to take images in which the problem of brightness saturation is overcome with respect to the brightness distribution of the image-forming diffracted light unless the image is taken in a special environment, and this is not useful as a technique which eliminates unwanted diffracted light.

SUMMARY OF THE INVENTION

It is an object of the present invention to provide image processing technology that enables a high quality image to be obtained from image information acquired by taking an image of an object with a particularly high brightness, by specifying an image which corresponds to an image produced by non-image forming light and subjecting that image to image processing to make the image difficult to recognize visually.

According to one aspect, the present invention provides an image processing apparatus which processes image information which includes a first image component which was responsive to an image-forming light and a second image component which was responsive to a non-image forming light. The apparatus has an image acquiring section which acquires the image information and an edge processing section which conducts edge processing with respect to the image information, the edge processing distinguishes the second image component with respect to the first image component.

According to another aspect, the present invention provides an image-taking system which has an optical system which includes a diffractive surface, a photoelectric conversion element which conducts photoelectric conversion of an optical image formed by the optical system, and the above image processing apparatus which processes image information acquired by using the photoelectric conversion element.

According to a further aspect, this invention provides an image processing method and image processing program which conduct image processing of image information which includes a first image component which was responsive to an image-forming light and a second image component which was responsive to a non-image forming light. The image processing method and the image program have a step of acquiring the image information and a step of performing edge processing with respect to the image information, the edge processing distinguishes the second image component with respect to the first image component.

According to a still further aspect, this invention provides an image processing apparatus which processes an electronic image obtained by forming an image on a photoelectric conversion element by use of an optical system which includes a diffractive optical element. The image processing apparatus has a pixel detecting section which detects the positions of high brightness pixels having a brightness that is equal to or greater than a predetermined value in the electronic image, a deterioration detecting section which detects or estimates a generated amount of image-quality deteriorating components which were generated by a diffracting action of the diffractive optical element in the electronic image by taking the high brightness pixels as reference points, and a correcting section which removes or reduces image-quality deteriorating components generated in peripheral regions of the high brightness pixels on the basis of a generated amount obtained by the deterioration detecting part.

According to a further aspect, this invention provides an image-taking system which has an optical system which includes a diffractive optical element, an image-taking section which includes a photoelectric conversion element which converts an image formed by the optical system into an electrical signal, and the above image processing apparatus which processes an image signal which is obtained by the image-taking section.

According to a still further aspect, this invention provides an image processing method and an image processing program which process an electronic image obtained by formation of an image on a photoelectric conversion element by an optical system which includes an optical element. The image processing method and image processing program have a step of detecting positions of high brightness pixels which have a brightness that is equal to or greater than a predetermined value in the electronic image, a step of detecting or estimating a generated amount of image-quality deteriorating components which were generated by a diffracting action of the diffractive optical element in the electronic image by taking the high brightness pixels as reference points, and a step of removing or reducing image-quality deteriorating components generated in peripheral regions of the high brightness pixels on the basis of a generated amount obtained by the deterioration detecting section.

The features of the image processing apparatus, image-taking system, image processing method and image processing program of this invention will be clarified by the following description of specific embodiments thereof referring to the drawings.

BRIEF DESCRIPTION OF THE DRAWINGS

FIG. 5B is a flowchart which shows processing operations in the image-taking system of Embodiment 1;

FIG. 12 is a schematic diagram which illustrates error detection and removal processing in Embodiment 1;

FIG. 23 is a schematic diagram of the layout of color filters for each color specification of an image-pickup element of FIG. 20;

FIG. 24 shows explanatory drawings of patterns of image-forming properties of $-1^{st}$- to $3^{rd}$-order diffraction light at, (A) an axial point, and (B) an off-axis point;

DETAILED DESCRIPTION OF THE PREFERRED EMBODIMENTS

Figure 1:
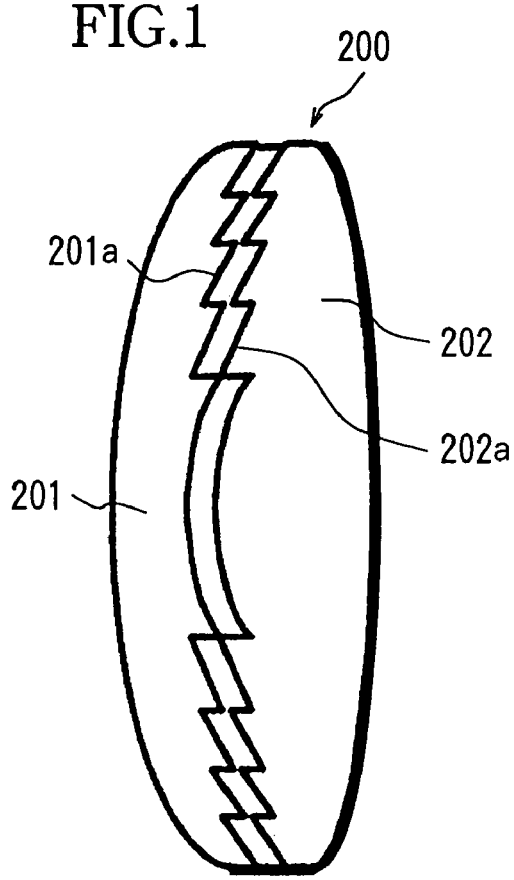
FIG. 1 is a schematic diagram of a layer-type diffractive optical element.
Figure 2:
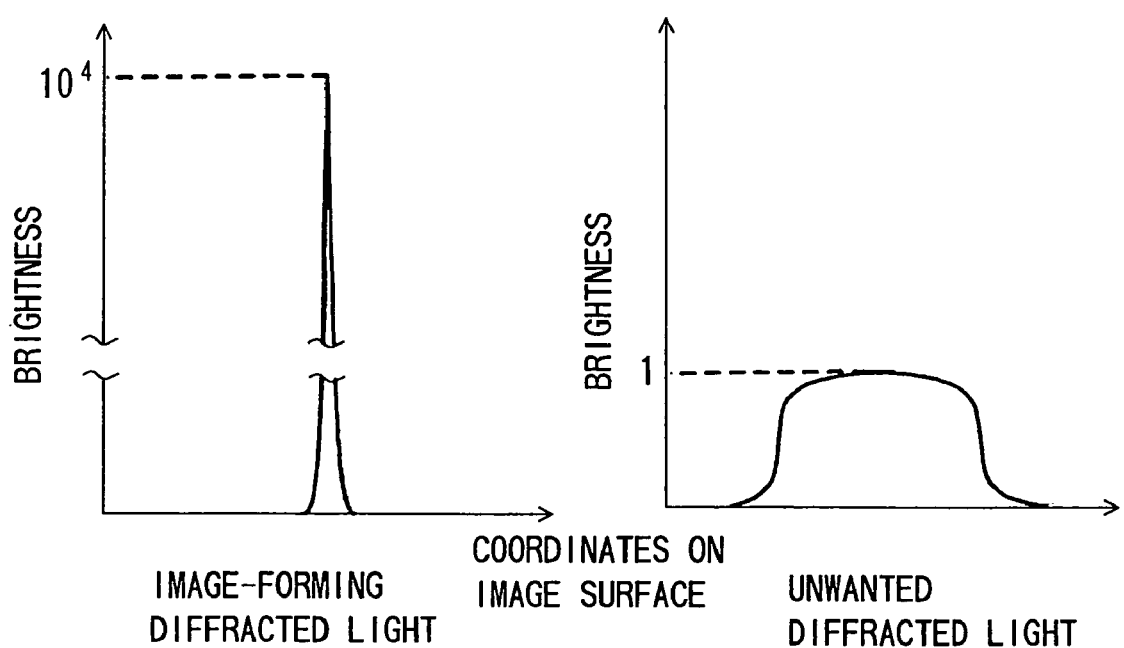
FIG. 2 is a brightness cross-section on an image surface for image-forming diffracted light and unwanted diffracted light.
Figure 3:
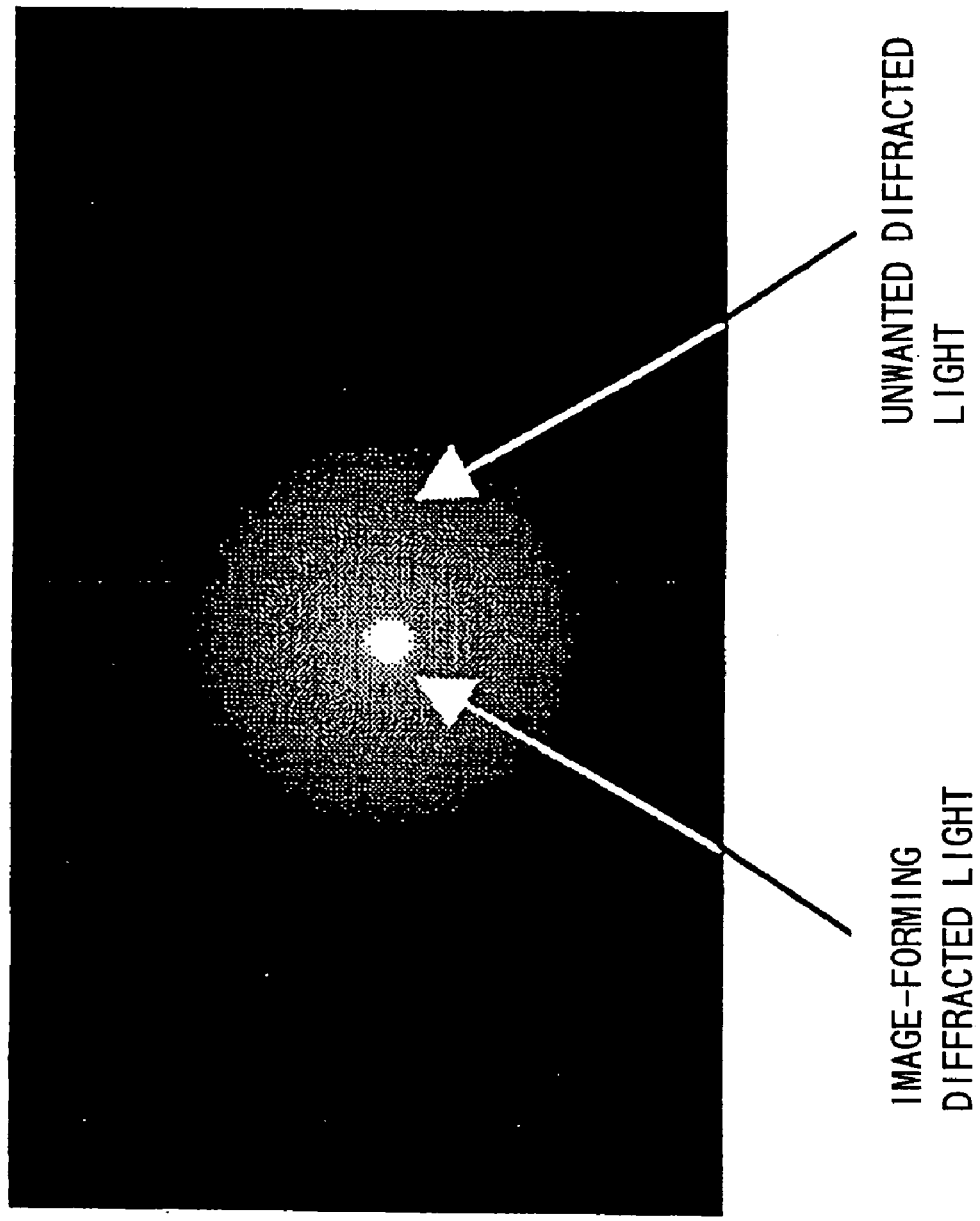
FIG. 3 is a schematic diagram of a flare image obtained by image-taking of a high-brightness point image.

Embodiments of this invention are described hereunder referring to the drawings.

Embodiment 1

Figure 4:
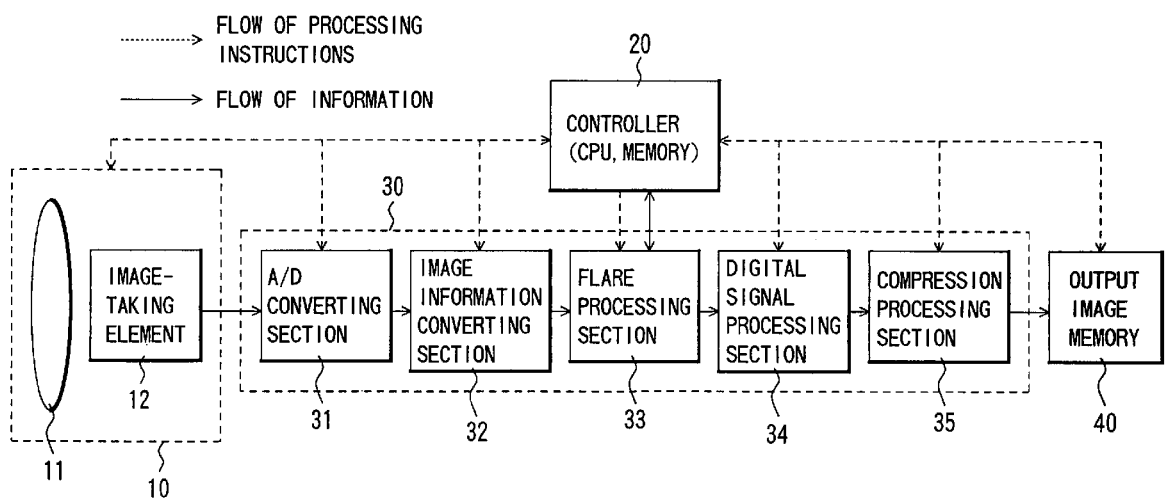
FIG. 4 is a block diagram which shows a structure of an image-taking system as Embodiment 1 of this invention.

FIG. 4 shows a system block diagram of a digital still camera as an image-taking system which includes an image processing apparatus as Embodiment 1 of this invention. In FIG. 4, arrows with a dotted line indicate the flow of processing instructions and arrows with a solid line indicate the flow of information.

The digital camera shown in FIG. 4 has an image-taking section 10, a controller 20, an electrical signal processing section 30, and an output image memory 40. Of these, the image-taking section 10 has an image-taking optical system 11 which includes a diffractive optical element which has a diffractive surface, and an image-pickup element 12 which is composed of a photoelectric conversion element such as a CCD sensor or CMOS sensor. The image-taking section 10 forms an image of an object image from the image-taking optical system 11 on a light-receiving surface of the image-pickup element 12, and outputs an electrical signal from the image-pickup element 12.

The electrical signal processing section 30 has an A/D converting section 31, an image information converting section 32, a flare processing section 33, a digital signal processing section 34 and a compression processing section 35. The electrical signal processing section 30 converts an electrical signal from the image-pickup element 12 into a displayable image signal. The image information converting section 32 converts a digital signal from the A/D converting section 31 into image information, and the flare processing section 33 performs correction of image-quality deteriorating components (flare correction processing) in the image information in a manner described hereafter. More specifically, this embodiment illustrates an example in which flare correction processing is conducted by use of hardware. In this embodiment, an image processing apparatus in the digital still camera comprises the image information converting section 32 and the flare processing section 33.

The controller 20 has a CPU and a memory, and is responsible for the overall control of the digital still camera and also stores various information other than image information.

The output image memory 40 stores an image signal which was output from the electrical signal processing section 30.

The image-taking optical system 11 uses a layer-type diffractive optical element 200 as shown in FIG. 1 as at least one of a plurality of lens units which are included therein. By using as an image-taking light (image-forming light) a first-order diffracted light component which was subjected to a diffracting action of the layer-type diffractive optical element 200 from among light from an object which is incident on the layer-type diffractive optical element 200, a chromatic aberration is favorably corrected and a compact image-taking optical system which has advanced image-forming performance can be provided.

Further, since a first-order diffracted light component and separated unwanted diffracted light components ($0^{th}$ order or $2^{nd}$ order diffracted light components) that are subject to a diffracting action of the layer-type diffractive optical element 200 are also reduced to some degree, when taking an image of an object which has a light intensity which is within the dynamic range of a brightness value of the image-pickup element 12, flare which is generated by unwanted diffracted light remains at a level at which it largely cannot be visually recognized. In this embodiment, the image-taking optical system 11 is taken as a telephoto lens which has small variations in image-forming properties caused by angle of view.

Figure 5A:
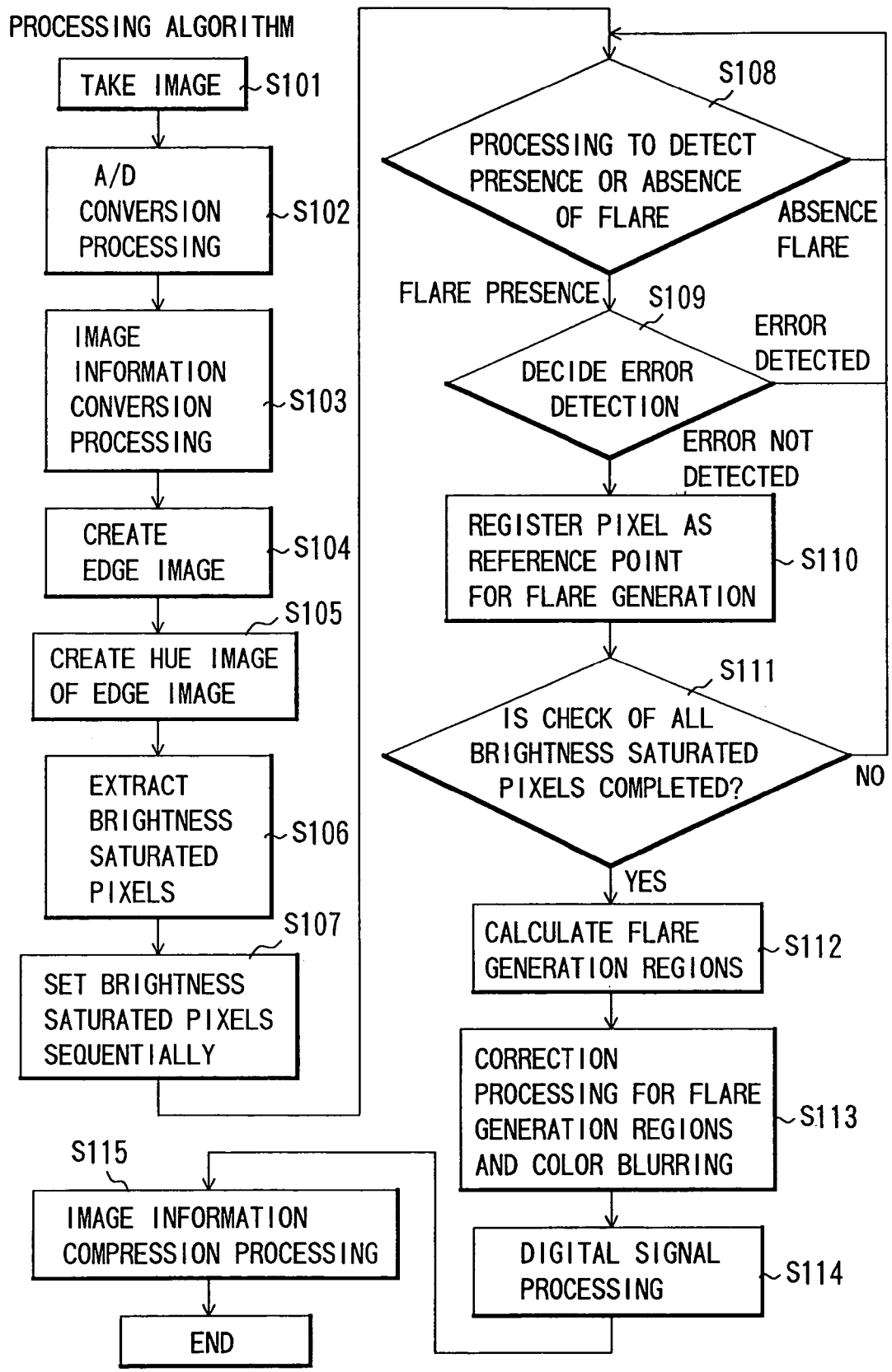
FIG. 5A is a flowchart which shows processing operations in the image-taking system of Embodiment 1.

FIG. 5A shows a flowchart which illustrates an algorithm of a processing operation in the digital still camera of this embodiment. A controller 20 outputs operation instructions to each of the above sections in accordance with a program stored in an internal memory to conduct each processing operation. Thus, correction processing is conducted for a flare image which was produced by unwanted diffracted light generated when an image was taken of an object which includes a highlight (hereunder, simply referred to as "flare image").

First, in a step (denoted by "S" in the figure) 101, in response to an operation which turns ON an image-taking switch which is provided in the digital camera, the controller 20 starts a photoelectric conversion operation (image-taking operation) of the image-pickup element 12 in the image-taking section 10. An object image formed by the image-taking optical system 11 forms an image on a light-receiving surface of the image-pickup element 12. The image-pickup element 12 has a plurality of light-receiving pixels, and each pixel outputs an electrical signal in accordance with the intensity of a light signal which corresponds to received light.

The image-taking optical system 11 has a zoom function and an adjustable diaphragm function, and the zoom state, aperture amount and lens extension amount at the time of image-taking are detected by the controller 20 via a sensor (not shown in the figure).

Figure 7:
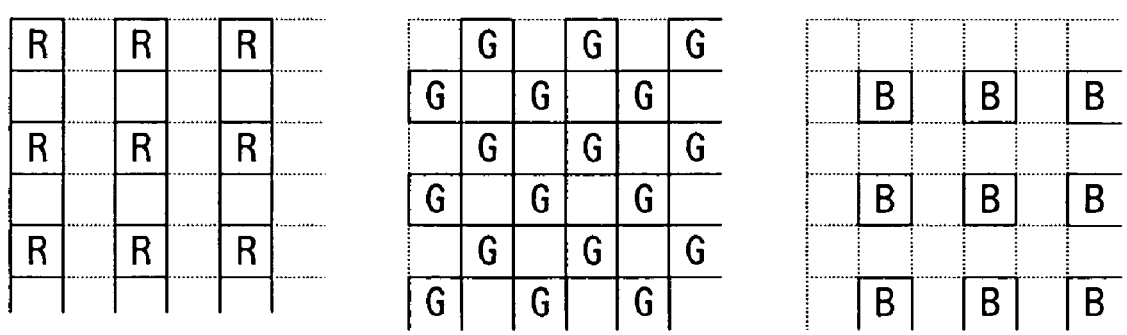
FIG. 7 is a view which shows an example of the layout of each color specification pixel of an image-pickup element in the image-taking system of Embodiment 1.

Further, as shown in FIG. 7, color filters for red (R), green (G) and blue (B) are systematically arrayed for each pixel on the light-receiving surface (pixel surface) of the image-pickup element 12, whereby pixels for R, G and B are formed. Based on electrical signals which are output from the pixels for each color, image information (original image information) for each color is generated as described hereunder. The controller 20 controls the exposure time and exposure timing of the image-pickup element 12, and electrical signals from each light-receiving pixel are transferred to the electrical signal processing section 30.

In step 102, the controller 20 instructs the A/D converting section 31 of the electrical signal processing section 30 to convert an electrical signal that was transferred from the image-taking section 10 into a digital signal. The digital signal is then transferred to the image information converting section 32.

In step 103, the controller 20 instructs the image information converting section 32 to convert a digital signal from the A/D converting section 31 into image (gradation) information. At this point, since information based on electrical signals from pixels for each of the color specifications R, G, and B in the image-pickup element 12 is information for one color specification, pixel interpolation processing is conducted for each color specification by use of image information conversion processing to generate original image information for all of the pixels for each color specification.

Any format may be used for the pixel interpolation processing at this time as long as it does not impart nonlinearity to the brightness of the image information. The thus obtained original image information of each color specification is transferred to the flare processing section 33.

Figure 6:
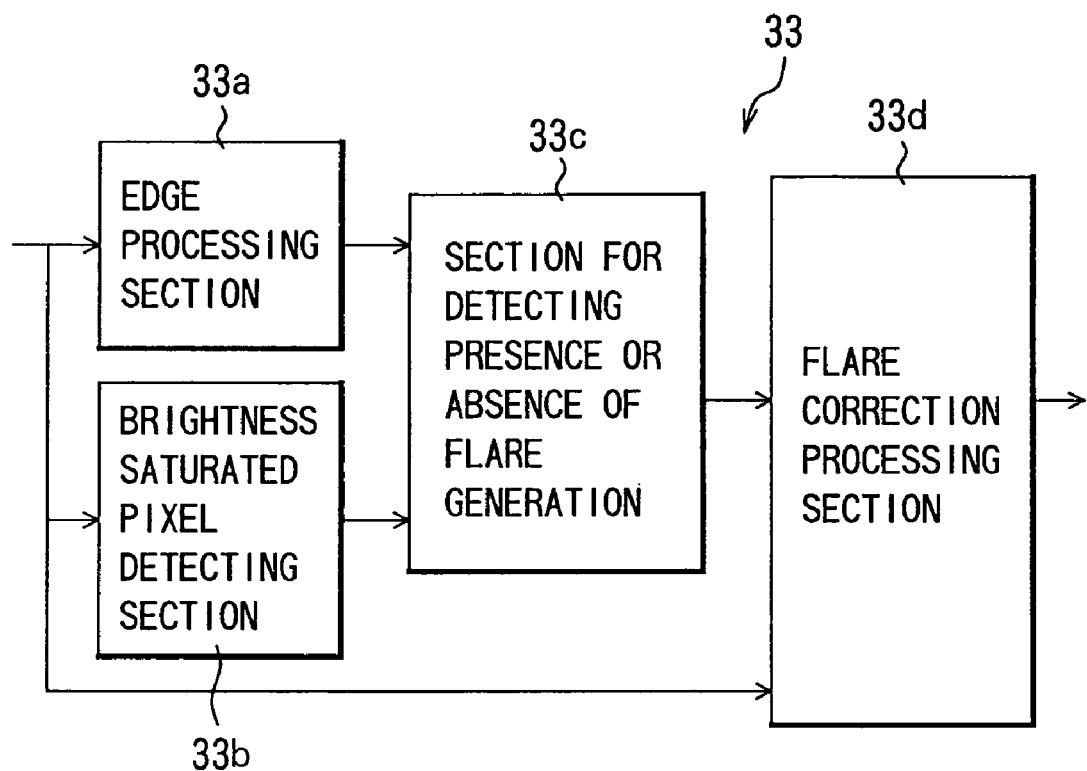
FIG. 6 is a block diagram which shows a structure of a flare processing section in the image-taking system of Embodiment 1.

In step 104, the controller 20 instructs the flare processing section 33 to conduct flare correction processing. As shown in FIG. 6, the flare processing section 33 has an edge processing section 33a, a brightness-saturated pixel detecting section 33b, a flare detecting section 33c which detects presence or absence of flare generation, and a flare correction processing section 33d. In the flare processing section 33, detection and correction is conducted for flare images resulting from unwanted $0^{th}$ order and $2^{nd}$ order diffraction light which impart particularly adverse effects on an image.

Original image information of each color specification that was transferred from the image information converting section 32 is first transferred to the edge processing section 33a. In the edge processing section 33a, edge processing is performed as pretreatment to facilitate easy and favorable detection of the presence or absence of flare generation to be conducted later.

The reason for conducting edge processing will now be explained. FIG. 8 schematically shows a flare image produced by unwanted diffraction light on an image-forming surface (the light-receiving surface of the image-pickup element 12). In this embodiment, an example is taken in which the diffraction order of the image-forming diffracted light is the first order.

Figure 8C:
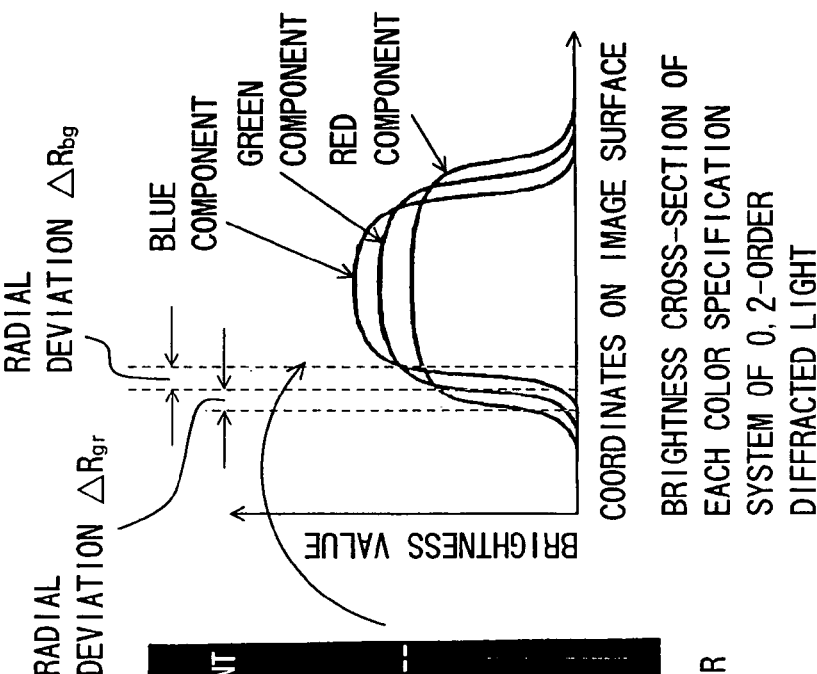
In FIG. 8, (A) is a schematic diagram which shows image-forming properties of $-1^{st}$- to $3^{rd}$-order diffraction light, (B) is a schematic diagram which shows image-forming properties of diffraction light of the $0^{th}$ order and $2^{nd}$ order, and (C) is a brightness cross-section of diffraction light of the order of $0^{th}$ order and $2^{nd}$ order.
Figure 8B:
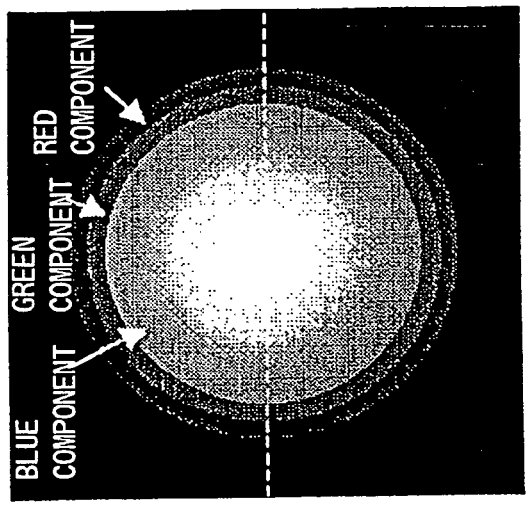
Figure 8A:
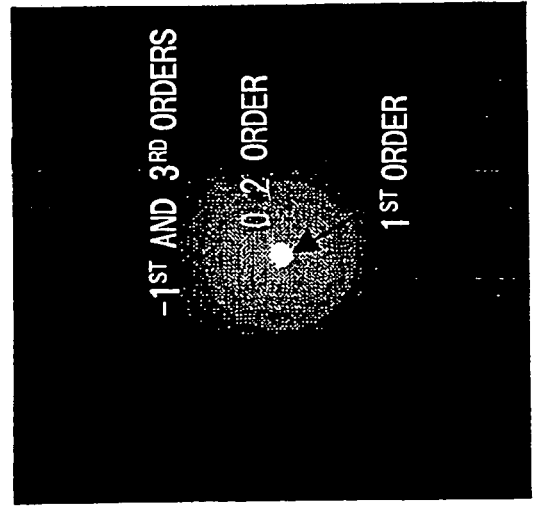

As shown in FIG. 8(A), unwanted diffracted light (diffracted light of the $0^{th}$ order and the $2^{nd}$ order) forms a large image around the periphery of the image-forming diffracted light (first-order diffracted light), and the diameter of that image grows larger as the difference between the diffraction order thereof and the image-forming diffraction order increases.

Generally, when attention is focused on unwanted diffracted light of given diffraction orders, it is found that the shapes of images resulting from the unwanted diffracted light vary for each wavelength. When the unwanted diffracted light forms a large blurred image, the diameter of the blurred image increases from a blue region to a red region. When image-taking is conducted of this image produced by unwanted diffracted light using a camera which has R, G, and B channels, a flare image that was responsive to the unwanted diffracted light is formed as shown in FIG. 8(B), and a brightness cross-section thereof is as shown in FIG. 8(C).

Thus, an image resulting from unwanted diffracted light is formed in which the diameter differs for R, G and B, respectively. Therefore, in this depth region, the color tends to blur from the center towards the outer edge in the form of white→yellow→red.

To correct a flare image which has appeared in image information, the region of blurred color may be detected and the region in which a flare image was generated or the most visually detrimental color blurring region can be corrected to form a visually satisfactory image.

However, it is not preferable to detect the flare image region or color blurring region using a taken image (original image information) as it is. When a flare image resulting from unwanted diffracted light is generated in a taken image, an image is formed in which the brightness of a background image that was responsive to image-forming light and the brightness of the flare image are mixed, and therefore it is extremely difficult to correctly determine a flare image region using the color distribution or brightness distribution of the flare image in a state where these two brightnesses are combined.

It is thus necessary to conduct processing to exclude the effects of the brightness of the background image and to bring only a brightness component of the flare image region into sharp relief (in other words, to distinguish the flare image from the background image). Therefore, edge processing is performed by the edge processing section 33a as this form of processing.

The contents of the edge processing are described hereunder. In this edge processing, processing is conducted through which the brightness of a background image is relatively weakened, and the characteristics of a flare image region or color blurring region are emphasized.

The procedure involves first setting a pixel as a target for processing for a given color specification and then calculating differences in brightness values between the target pixel and pixels in a surrounding region. By conducting this processing for all pixels of image information for all color specifications, an image can be obtained in which edge processing has been completed for each of R, G and B (hereunder, referred to as an "edge image").

More specifically, the differences between the brightness value of the target pixel and the mean values for the brightness of pixels in a predetermined pixel width adjoining the target pixel in four specified directions of left, right, upward and downward are respectively obtained. The value for the predetermined pixel width is set at about the difference between the radii of the images of each color specification of the unwanted diffracted light. The radii differences $\Delta Rbg$ and $\Delta Rgr$ in the case shown in FIG. 8(C) correspond thereto, and either of these may be used or the mean of both thereof may be used.

If a negative value is obtained for a value for the differences in brightness values in the above four directions, the value for brightness difference is set at zero or a predetermined positive value. The sum of the differences in the brightness values in the four specified directions is then obtained, and this is set as the value for the result of edge processing for the target pixel.

The reason for conducting processing which obtains differences in brightness values in the four directions is to detect color blurring which may occur in various directions. Accordingly, the directions for processing which obtains differences in brightness values is not limited to the above four directions, and for example, the directions may be an outward direction and an inward direction on a radius vector having the target pixel as its center and the directions of a line segment which intersects vertically with the radius vector. The number of directions for processing may be other than four, as long as color blurring can be effectively detected.

The various parameters for edge processing are stored in the internal memory of the controller 20, and edge processing is implemented using this information.

When this edge processing is conducted for all pixels of image information of color specifications, an edge image is obtained in which the annular zone of a flare image (color blurring region) is made to stand out strongly with respect to a background image.

Figure 9B:
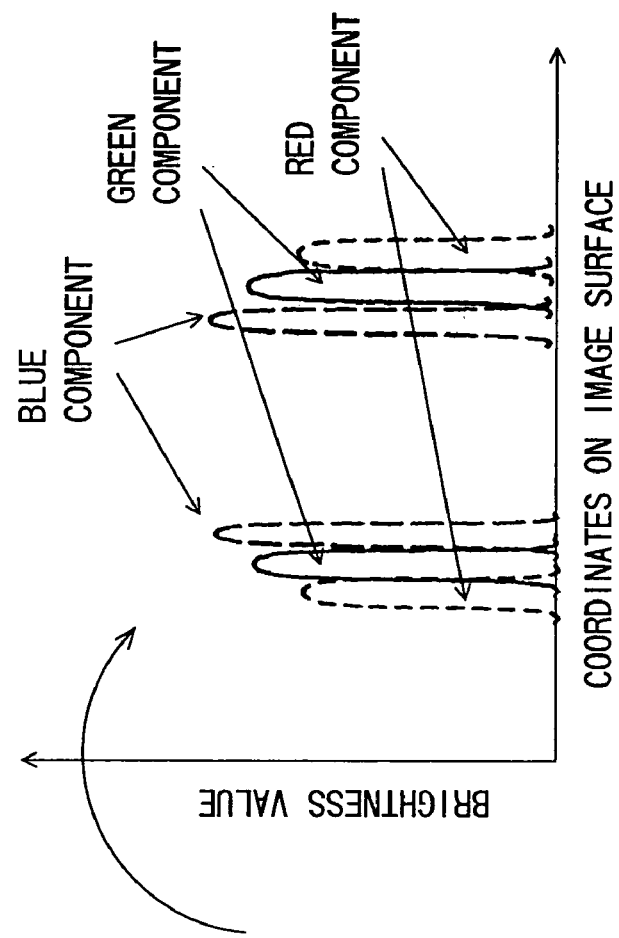
In FIG. 9, (A) is a schematic diagram of flare image components in an edge processing image, and (B) is a brightness cross-section of the flare image.
Figure 9A:
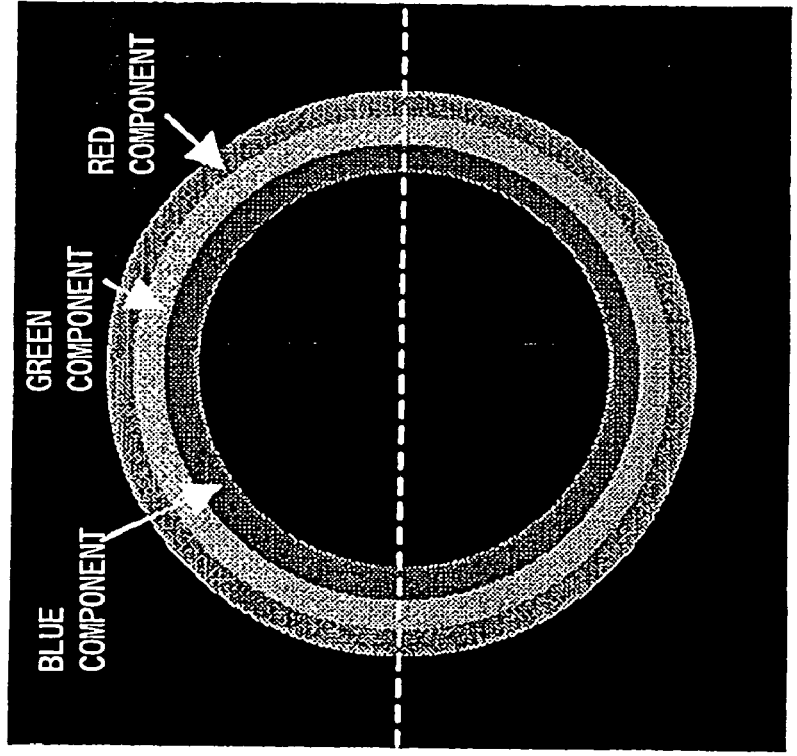

FIGS. 9(A) and (B) show an edge image and the brightness cross-section thereof. By investigating the characteristic annular zone brightness distribution or hue distribution of the flare image in this edge image, it is possible to detect the generation of a flare image.

In this embodiment, in step 105, in response to an instruction from the controller 20 edge image information is further converted into image information as hue distribution information, and the hue image information is transferred to the section for detecting presence or absence of flare generation 33c.

Figure 10A:
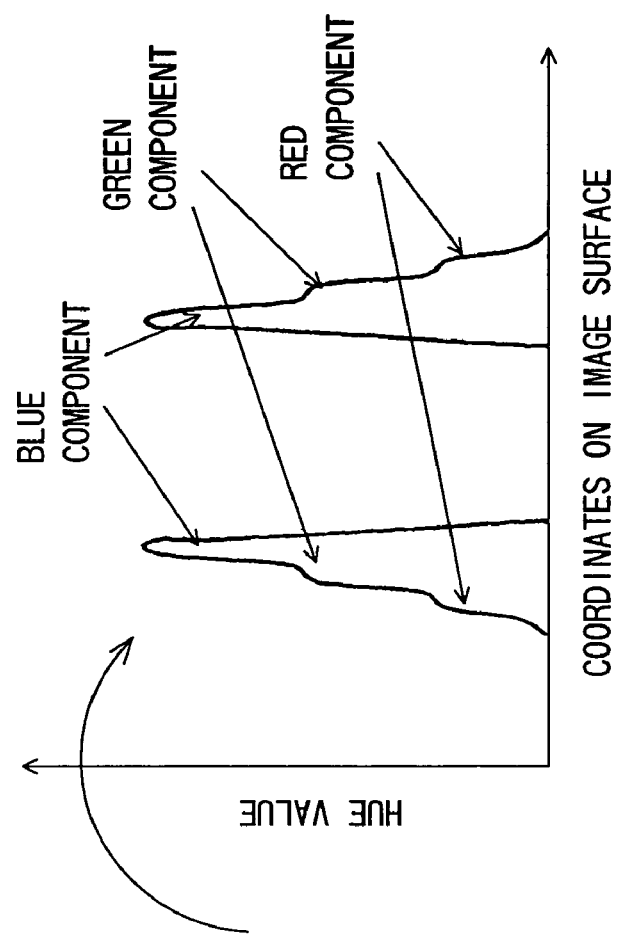
In FIG. 10, (A) is a schematic diagram of a hue image, and (B) is a brightness cross-section of the hue image.
Figure 10B:
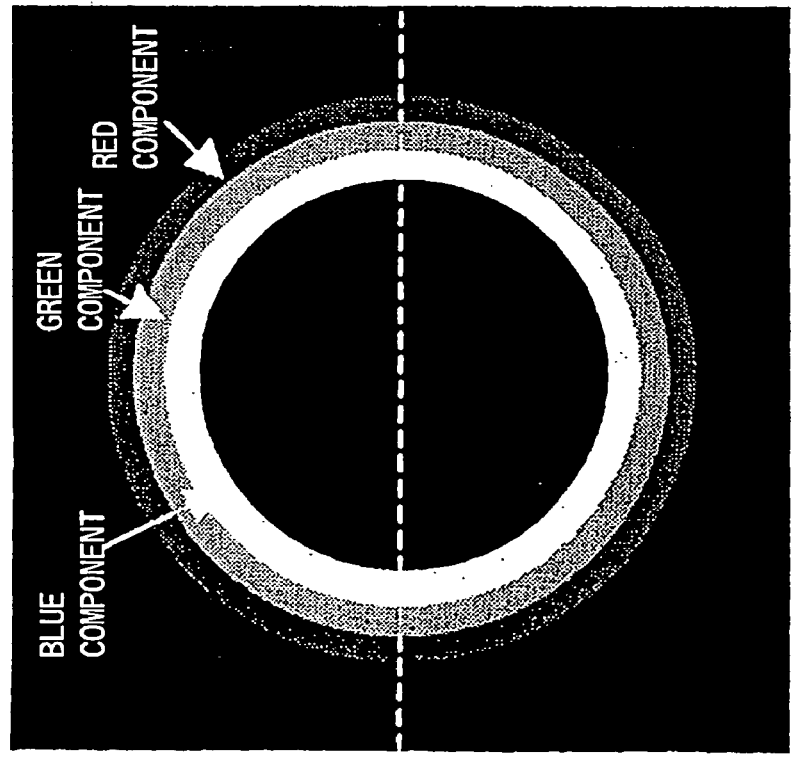

FIGS. 10(A) and (B) show the result of converting the edge image shown in FIGS. 9(A) and (B) into an image (hue image) which shows hue distribution. Conducting this hue conversion makes it possible to work with only one channel from image information with three channels, thereby enabling simplification of flare detection processing which is described hereunder.

In step 106, which is performed in parallel with the above edge processing or after completion of the edge processing, in response to an instruction from the controller 20, detection of a brightness-saturated pixel in a taken image (image information) is conducted in the brightness-saturated pixel detecting section (pixel specifying means) 33b. More specifically, pixels for which brightness is saturated (the brightness value exceeds the upper limit value of the dynamic range) are detected in the image information of each color specification, and of these detected brightness-saturated pixels, the addresses of only pixels for which brightness is saturated in all color specifications are extracted.

Next, in steps 107 to 113 as post-processing, operations are performed to check whether or not flare images have been generated (whether or not the conditions for generation of a flare image are fulfilled) by taking the pixels for which brightness is saturated for all color specifications as reference points, and processing which corrects color blurring is then conducted based on the brightness-saturated pixels that were reference points for regions in which it was determined that a flare image was generated.

The reason that pixels for which brightness is saturated for all color specifications are taken as reference points is that, in most cases an object which emits a light quantity that is strong enough to produce flares caused by unwanted diffracted light emits white light which has an extremely high brightness in comparison to peripheral objects such as sunlight or electric lighting used at night. When a highlight from this type of light source is incident on a camera, even if the color of the light source is tinged with red or blue, the spectral characteristics of the light source have an edge structure in a blue or red wavelength region. When a highlight is incident thereon to a degree such that flares are generated by unwanted diffracted light, the spectral characteristics of this edge region also result in a light quantity of a degree such that brightness saturation occurs. Therefore, by conducting correction processing as described above in which only pixels for which brightness is saturated in all color specifications are used as reference points, it is possible to eliminate unnecessary processing which takes as a target pixel a pixel for which brightness happens to be saturated in a given color specification even though a highlight is not incident to a degree whereby a flare is generated by unwanted diffracted light.

Address information of brightness-saturated pixels obtained in this manner by detection processing for brightness-saturated pixels is transferred to the section for detecting presence or absence of flare generation (region specifying means) 33c.

In step 107 and step 108, in response to an instruction from the controller 20, the section for detecting presence or absence of flare generation 33c performs processing to specify a flare image region using hue image information obtained by the edge processing section 33a, employing as reference points the addresses of brightness-saturated pixels obtained by the brightness-saturated pixel detecting section 33b.

The specific contents of the processing at the section for detecting presence or absence of flare generation 33c will now be described referring to FIG. 5B. First, in step 201, employing a brightness-saturated pixel as a reference point, a plurality of directions for checking are set in the left, right, upward and downward direction from the pixel. Then, in steps 202 to 206, the hue mean values in specified regions in the above checking directions for a red component, green component and blue component of a flare image are calculated. The specified regions in the plurality of checking directions correspond to active regions in the edge processing directions for distinguishing a flare image resulting from unwanted diffracted light of the $0^{th}$ order and the $2^{nd}$ order by taking as a basis the barycenter of image-forming diffracted light components.

Figure 11:
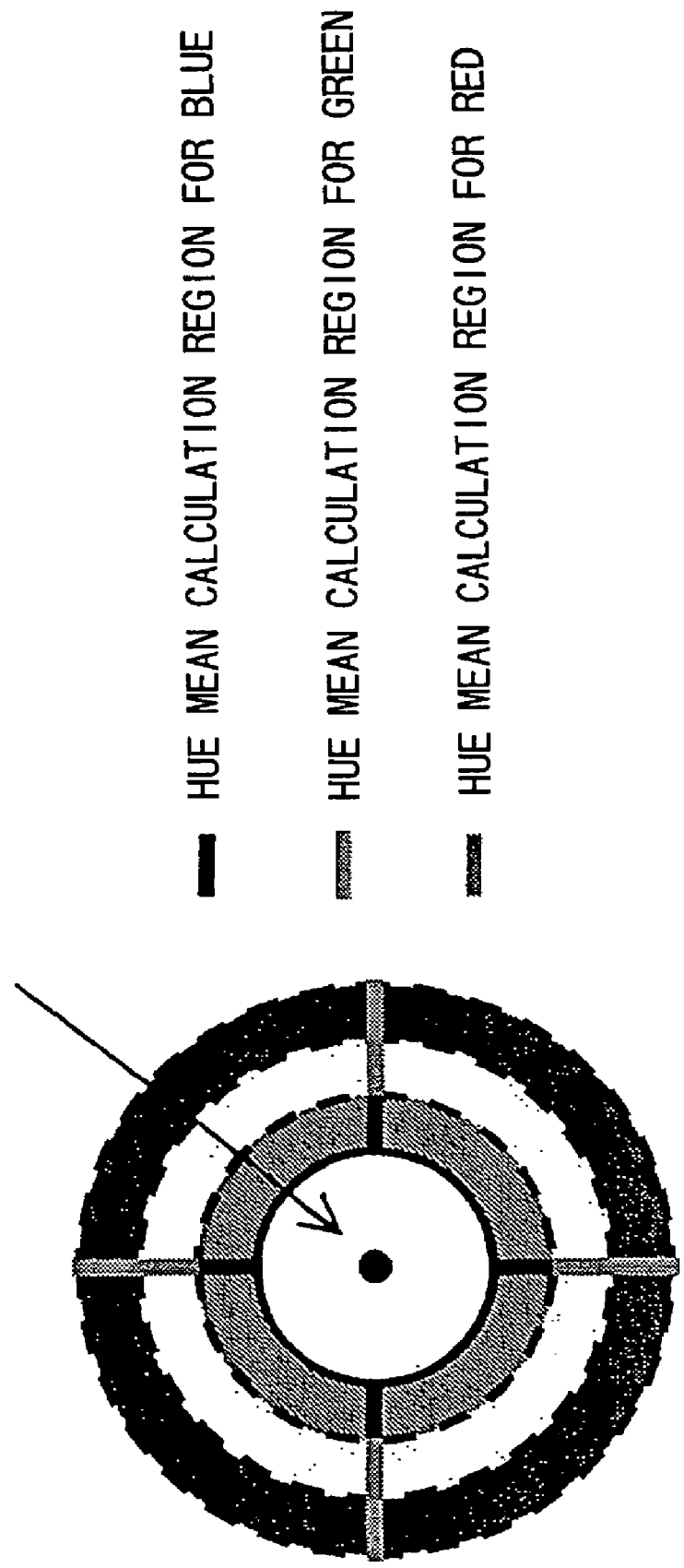
FIG. 11 is a schematic diagram which illustrates processing to detect the presence or absence of flare images in Embodiment 1.

FIG. 11 schematically shows the aforementioned specified regions (hue mean calculation regions). The respective hue mean calculation regions of a red component, green component and blue component of a flare image are set in a left, right, upward and downward direction taking as a reference the position of the pixel that is the object of processing.

In step 207, an operation is performed to determine whether or not a hue mean value of each color component in at least one direction among the above four directions fulfills the conditions shown in formula (1) below. When the conditions are fulfilled, the pixel that is the object of processing (brightness-saturated pixel) is determined to be a pixel involved in generation of a flare image, that is, a provisional flare-generating pixel which is possibly a pixel which corresponds to a light source image that produced a flare image (pixel that is origin of flare generation). Then, a flag is set with respect to the pixel in question to show that it is a provisional flare-generating pixel.

$$HB-HG > \Delta HBG$$

$$HG-HR > \Delta HGR \quad (1)$$

Wherein, HB, HG and HR are the hue mean values of B, G and R respectively, and $\Delta HBG$ and $\Delta HGR$ are the minimum values (parameter values) of the difference in hue mean value between B and G, and G and R, respectively.

The parameter values $\Delta HBG$ and $\Delta HGR$ are values which are calculated from theoretical values or measured values or the like of unwanted diffraction light which depend on the optical structure of the image-taking optical system 11, and they are stored in the internal memory of the controller 20 and used in detecting the presence or absence of flare generation.

By conducting the above processing sequentially for all brightness-saturated pixels (steps 107 and 108), it is possible to extract all of the provisional flare-generating pixels.

However, there is a possibility that the provisional flare-generating pixels extracted in this manner include points that were extracted because they happen to fulfill the conditions of the above formula (1) even though a flare image was not generated at the point in question. Therefore, in this embodiment, in steps 109 to 111 processing is conducted for the provisional flare-generating pixels to exclude pixels which were extracted due to such kinds of erroneous detection from the target pixels, thereby raising the accuracy of the detection of pixels as flare generation reference points.

This error detection and removal processing is described below. This processing is performed sequentially for all provisional flare-generating pixels. In this processing, as shown in FIG. 12, a target pixel is first set, and a radius vector is then set which rotates around the pixel as a reference point.

The length of the radius vector is set at a value that is the same as the maximum radius of a flare image produced by unwanted diffraction light of the $0^{th}$ order and the $2^{nd}$ order, or a value slightly larger than that. Further, in the direction of that radius vector, each color blurring region of R, G and B at the time the above edge processing was performed for a flare image produced by unwanted diffracted light of the $0^{th}$ order and the $2^{nd}$ order are set as shown in FIG. 12. Thus, when the radius vector is rotated, the hue mean value of a region in which each color blurring region in a hue image intersects with the radius vector is calculated for each of the regions and that value is again checked against the conditions of formula (1), and only those target pixels that fulfill the conditions are designated as pixels that are flare generation reference points (step 110).

The various parameters used in error detection and removal processing are stored in the internal memory of the controller 20. Through this error detection and removal processing, it is possible to extract to a high degree of accuracy only pixels that are reference points for color blurring (flare images).

Although a similar result can be obtained by performing only the error detection and removal processing with respect to all brightness-saturated pixels extracted in step 106, because the processing is relatively time consuming, a method in which provisional flare-generating pixels are first selected and then pixels as flare generation reference points are designated by error detection and removal processing enables a reduction in the number of target pixels to conduct error detection and removal processing, enabling the processing time to be shortened. The addresses of pixels as flare generation reference points which were detected by the section for detecting presence or absence of flare generation 33c are transferred to the flare correction processing section 33d.

Next, in step 112, in response to an instruction from the controller 20, the flare correction processing section 33d decides regions in which a flare image is generated (flare image regions) taking as references the pixels as flare generation reference points.

Figure 13A:
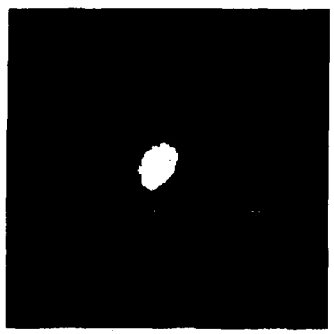
FIG. 13 is a schematic diagram which illustrates processing which determines a flare image region in Embodiment 1.
Figure 13B:
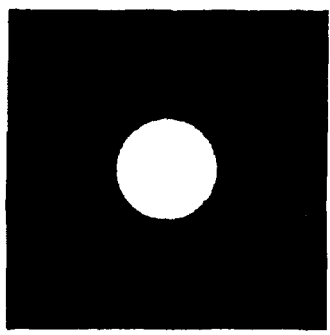
Figure 13C:
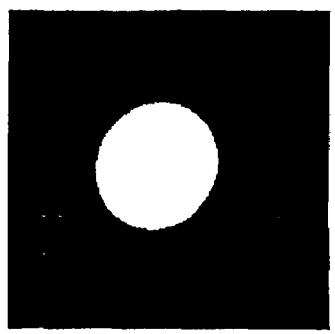

As shown in FIG. 5B, processing which determines a flare image region is conducted by performing convolution for a range of flare images which corresponded to the image-forming properties of unwanted diffraction light of the $0^{th}$ order and the $2^{nd}$ order with respect to all of the pixels as flare generation reference points (steps 301 to 303). A schematic diagram thereof is shown in FIG. 13. Information stored in the internal memory of the controller 20 is used for the image-forming properties of unwanted diffraction light of the $0^{th}$ order and the $2^{nd}$ order which conduct convolution at this time or the characteristic parameters thereof.

Next, in step 113, flare correction processing is conducted for only the flare image regions obtained by the above determination processing.

The flare correction processing performed here is color conversion processing to decrease the color blurring of flare images that are particularly conspicuous visually, in which a procedure is carried out whereby hue within a flare image region is converted so that it matches the hue of a background image region, the saturation within the flare image region is reduced, and the hue and saturation are filtered using an average (smoothing) filter. Thus, a satisfactory image (information) is obtained in which the visibility of a flare image component of a taken image (original image information) is reduced. The corrected image information in which the flare image component was reduced by the flare correction processing section 33d is transferred to the digital signal processing section 34.

In step 114, in response to an instruction from the controller 20, the digital signal processing section 34 conducts various kinds of image processing with respect to the corrected image information to produce image information which is more preferable as an image for appreciation. This processing includes brightness/color separation processing, white balance adjustment, gray balance adjustment, density adjustment and color balance adjustment processing, as well as edge enhancement processing. Image information that conducted image processing in the image processing section 34 is transferred to the compression processing section (output means) 35.

In step 115, in response to an instruction from the controller 20, the compression processing section 35 compresses image information that has completed image processing in accordance with a predetermined method of image compression processing. Any method may be used as the image compression method as long as the method is capable of compressing image information, and examples thereof include JPEG, TIFF and JPEG 2000. The compressed image information is transferred to the output image memory 40 as output image information and stored therein. Image information that has completed image processing may also be displayed on a display (output means) (not shown).

The output image memory 40 which stores an output image is a storage medium which is removable from the camera, and an output image can be directly transferred to a different information terminal device via this storage medium. The output image memory 40 may be of any form as long as it is a rewritable memory, and examples thereof include a semiconductor memory, magnetic memory, optical disk or other general-purpose memory.

As described above, according to this embodiment, even when an operator takes an image of an object which has highlights using a digital still camera which comprises the image-taking optical system 11 which includes a diffractive optical element, it is possible to satisfactorily correct a flare image in accordance with the unwanted diffracted light. It is thus possible to provide a compact and high performance digital camera.

This invention is not limited to the type of digital still camera described in this embodiment and can be applied to various image-taking systems. For example, an image-pickup element may be a single-plate type device or a three-plate type device, or may be of a different specification thereto. Further, the device need not be a digital still camera, and may be a digital video camera.

In this embodiment, while a case was described of detecting and correcting a flare image resulting from unwanted diffracted light of the $0^{th}$ order and the $2^{nd}$ order the processing may detect and correct a flare image resulting from unwanted diffracted light of a higher order than the $0^{th}$ order and the $2^{nd}$ order. Further, a decision as to whether or not to perform processing for unwanted diffracted light of a high order may be made by referring to the level of generation of flare images resulting from unwanted diffracted light of a low order.

In this embodiment, generation of a flare image resulting from unwanted diffracted light and subsequent correction processing were described on the premise of using a telephoto lens, and consideration was not given to the dependency of image-forming properties on the angle of view, however this may also be taken into consideration as a specification.

Further, while a case was described in this embodiment in which an edge image is converted into a hue image and processed, detection may be conducted for the presence or absence of a flare image (specification of flare image region) using brightness information of the edge images of R, G and B. In addition, hue image information or brightness information of the edge images of R, G and B can be segmented into areas and the existence of a flare image may be detected from statistics such as hue value and brightness value for each of the areas. Further, a flare image region may be specified by conducting pattern matching with respect to an edge image using the brightness distribution information of a typical flare image.

In this embodiment, although a case was described in which correction processing was conducted for color blurring in flare correction processing, the flare correction processing of this invention is not limited thereto. For example, brightness distribution of an object may be estimated in accordance with the size of pixels as flare generation reference points, and may be calculated from the original image information by employing convolution with a flare of the $0^{th}$ order and the $2^{nd}$ order. Further, when a brightness-saturated pixel is not detected in the brightness-saturated pixel detecting section 33b, it is preferable to skip the edge processing in the edge processing section 33a, the processing to detect the presence or absence of a flare image in the section for detecting presence or absence of flare generation 33c, and the flare image correction processing in the flare correction processing section 33d.

Embodiment 2

Figure 14:
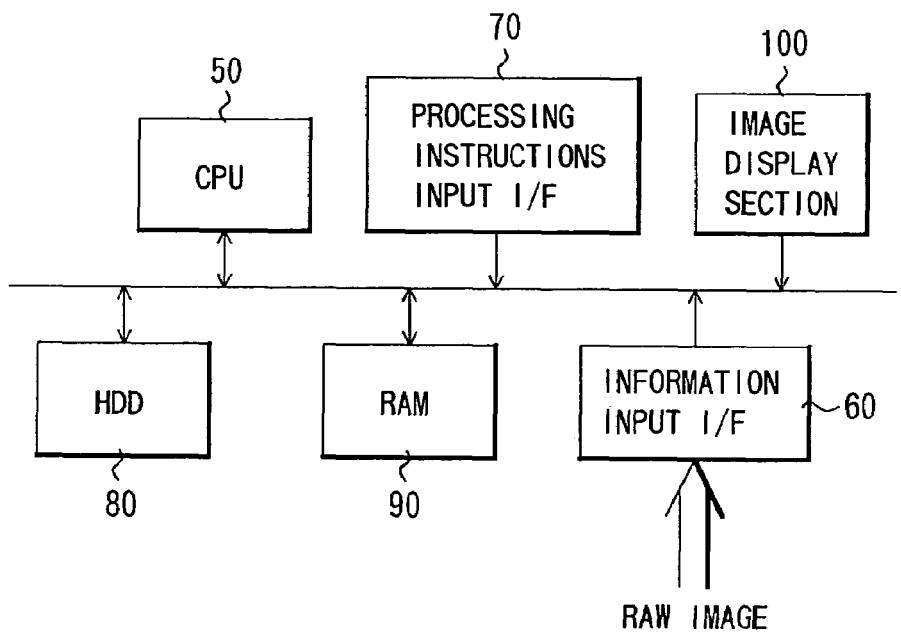
FIG. 14 is a block diagram which shows the structure of a computer as an image processing apparatus as Embodiment 2 of this invention.

FIG. 14 shows a system block diagram of a computer as an image processing apparatus as Embodiment 2 of this invention. This computer comprises a CPU (controller) 50 which conducts calculational processing and driving instructions of the computer, an information input interface 60 which is responsible for incorporation of information from outside the computer, a processing instructions input interface 70 which allows the user to input instructions to conduct a predetermined processing into the computer, a hard disk 80 which stores various information and the operating system of the computer, a RAM 90 which temporarily stores information which is necessary when implementing operations in response to an instruction from the CPU 50, and an image display section 100 for displaying information such as an image or a GUI. These are connected to each other by a bus which transfers processing signals and various information.

This computer incorporates onto the hard disk 80 via the information input interface 60 image information that was taken by an image-taking system equipped with an image-taking optical system which includes the layer-type diffractive optical element 200 shown in FIG. 1, information regarding optical properties such as the model name of the optical system used for image-taking, the zoom state of the image-taking optical system, the f-number and the lens extension amount, and information regarding the image-forming properties of the image-taking optical system. After performing the above processing to detect the presence or absence of generation of a flare image resulting from unwanted diffracted light which was generated by the diffractive optical element in a taken image and correction processing with respect to a flare image region, the computer conducts image processing to make the image in question into an image for appreciation, to thereby provide a favorable image.

Figure 15A:
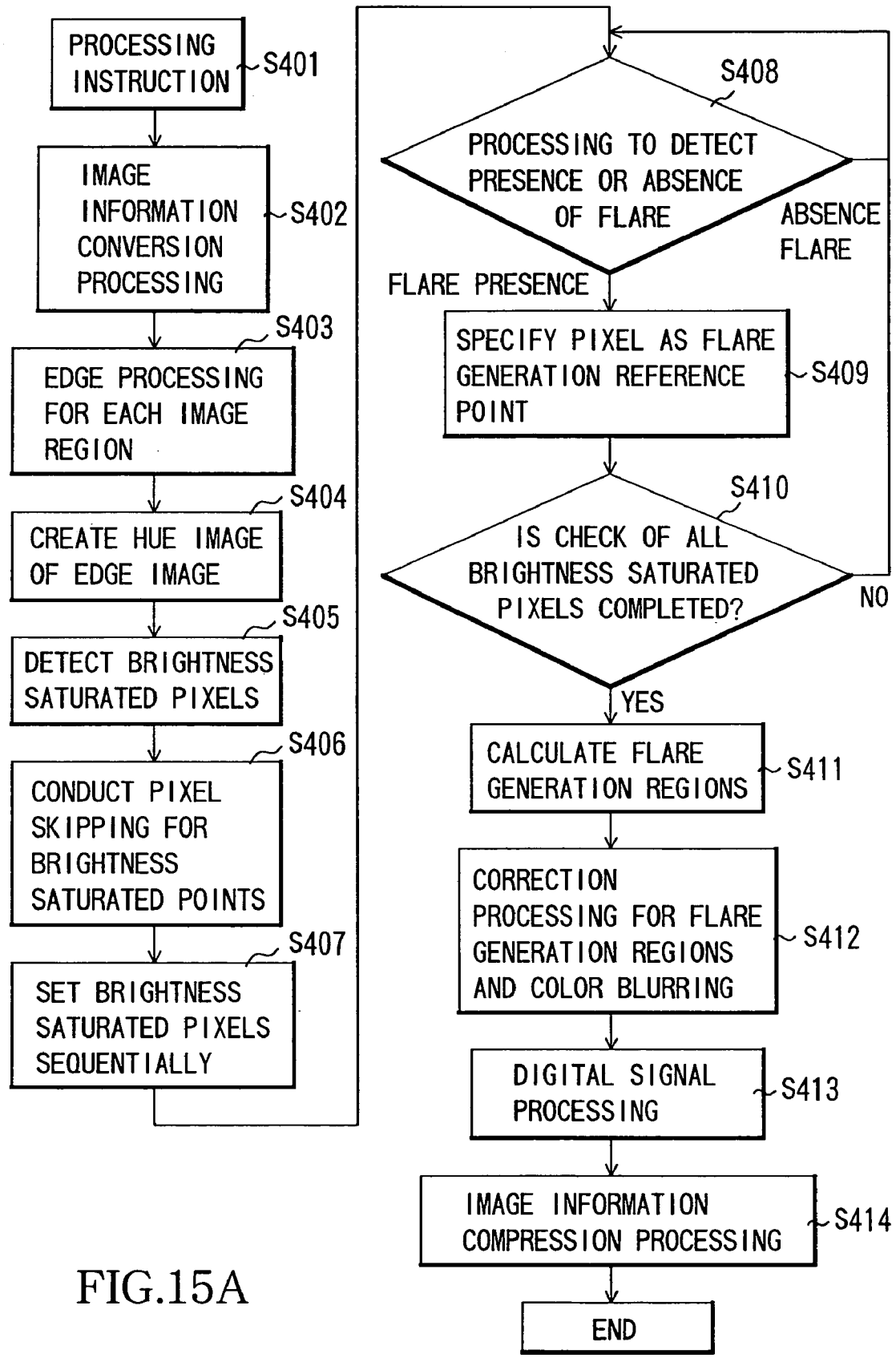
FIG. 15A is a flowchart which shows an image processing program of Embodiment 2.

Hereunder, an image processing program implemented by the computer of this embodiment is described referring to the flowchart shown in FIG. 15A. In this computer, through input by a user beforehand via the processing instructions input interface 70, image information which was taken by an image-taking system, information regarding the state of a lens when taking each image, and information regarding the image-forming properties in each lens state are stored on the hard disk 80 from the information input interface 60. The taken image information is raw image information which was not subjected to non-linear processing with respect to the brightness of information output from an image-pickup element of an image-taking system.

The color specification system of the image-taking system comprises an RGB color specification system, and the raw image information also has a color specification that conforms thereto.

In step 401, when a processing implementation instruction is input via the processing instructions input interface 70, a processing application, processing parameters, image information, information regarding the state of the lens when taking each image and information regarding the image-forming properties in each lens state are transferred from the hard disk 80 to the RAM 90. Thereafter, the CPU 50 conducts operational processing using the information which was provided to the RAM 90.

In step 402, raw image information conducts image information conversion processing. As shown in FIG. 7, raw image information is information generated based on electrical signals from pixels of each color of an image-pickup element in which color filters are systematically disposed on a light-receiving surface (pixel surface). Since an information component that corresponds to each pixel is the information of one color specification, pixel interpolation is conducted for each color specification by use of image information conversion processing to generate original image information that represents the entire pixel information of each color specification.

Next, in step 403, edge processing is conducted with respect to the original image information to facilitate detection of a flare image by diminishing the influence of a background image on a flare image (in other words, by distinguishing a flare image with respect to a background image).

In order to conduct effective detection of a flare image, the edge processing is this case may be processing that can conduct extraction in which the borders of each flare image of R, G and B do not overlap with each other or only overlap to a small degree. In this case, the optimal edge processing parameters will differ according to the image-taking appropriate system or camera model, the zoom state, f-number, lens extension amount, angle of view and the like. The optimal edge processing parameters may be calculated previously using calculated values or measured values for image-forming properties in each state of the image-taking optical system and stored on the hard disk 80. A specification may also be employed in which appropriate edge processing parameters can be specified by a user via the processing instructions input interface 70.

The edge processing parameters which relate to the angle of view will now be explained in detail. The image-forming properties of a flare resulting from unwanted diffracted light are different at an axial point which corresponds to a point of intersection of an image surface and an optical axis and an off-axis point that is a point other that point.

Figure 16B:
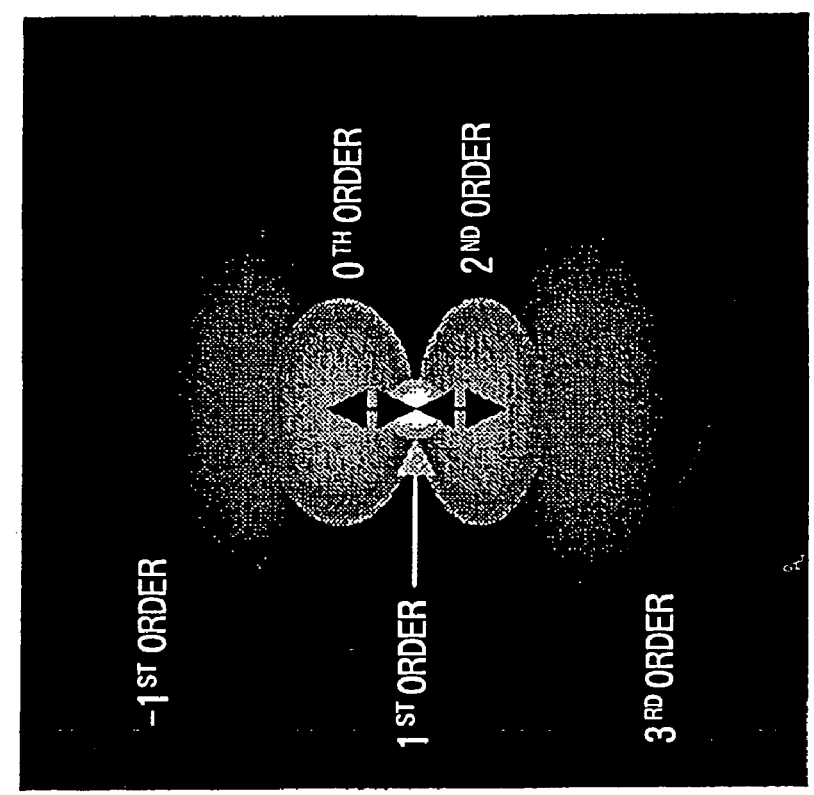
In FIG. 16, (A) is a schematic diagram which shows image-forming properties at an axial point of $-1^{st}$- to $3^{rd}$-order diffraction light, and (B) is a schematic diagram which shows image-forming properties at an off-axis point.
Figure 16A:
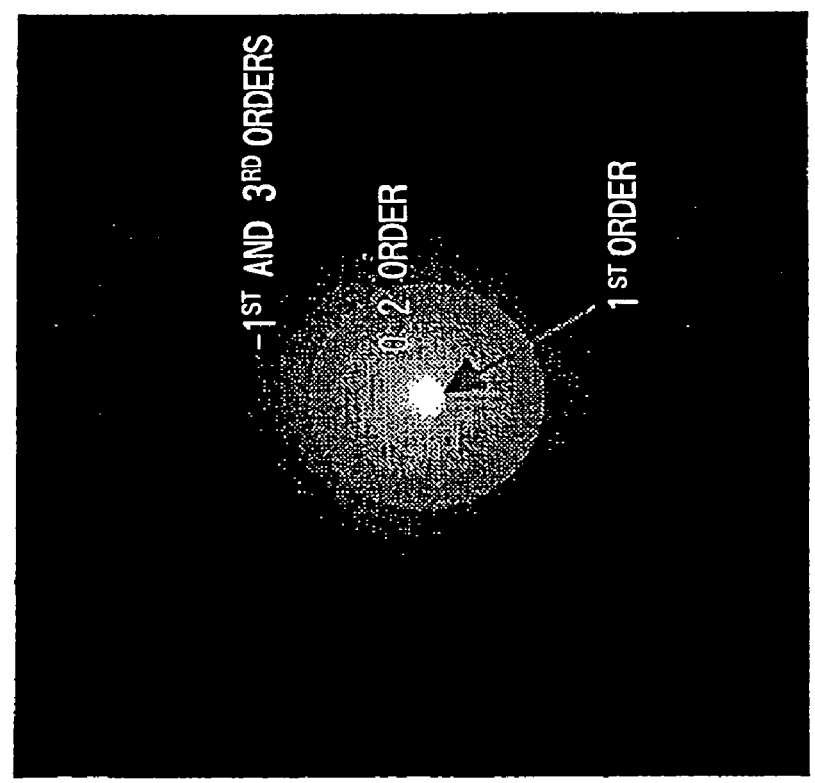

This is shown by the schematic diagrams of FIGS. 16(A) and (B). At the axial point shown in FIG. 16(A), images resulting from unwanted diffracted light of other diffraction orders overlap around an image of first-order diffracted light that is the image-forming diffracted light, and the radius of a given diffraction order increases in accordance with a difference between the given diffraction order and the image-forming diffraction order.

In contrast, at an off-axis point, centering on an image produced by the image-forming diffracted light, an image of a small order and an image of a large order with respect to that diffraction order separate with the barycenters thereof moving in different directions to each other along the direction of a radius vector which takes as a reference the axial point. The separation width increases in accordance with the difference between the order in question and the image-forming diffraction order. Further, images formed by unwanted diffraction light change from concentric circular shapes to elliptical shapes in accordance with an increase in the angle of view.

Figure 17:
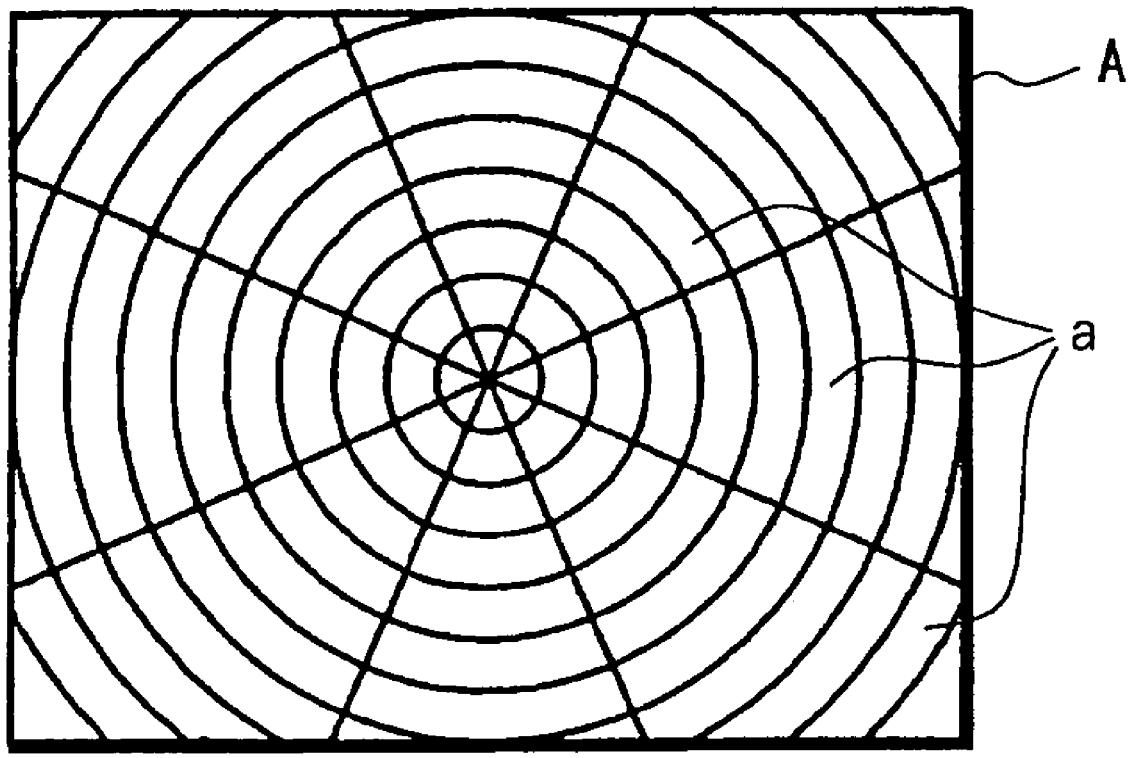
FIG. 17 is a schematic diagram which shows an example of region segmentation of image information to conduct edge processing.

Since the image-forming properties of unwanted diffraction light alter in accordance with the angle of view in this manner, it is necessary to change edge processing in accordance with the region in an image. More specifically, a total region A of image information is segmented as shown in FIG. 17 and edge processing is conducted that is different for each segmented region a.

Figure 18:
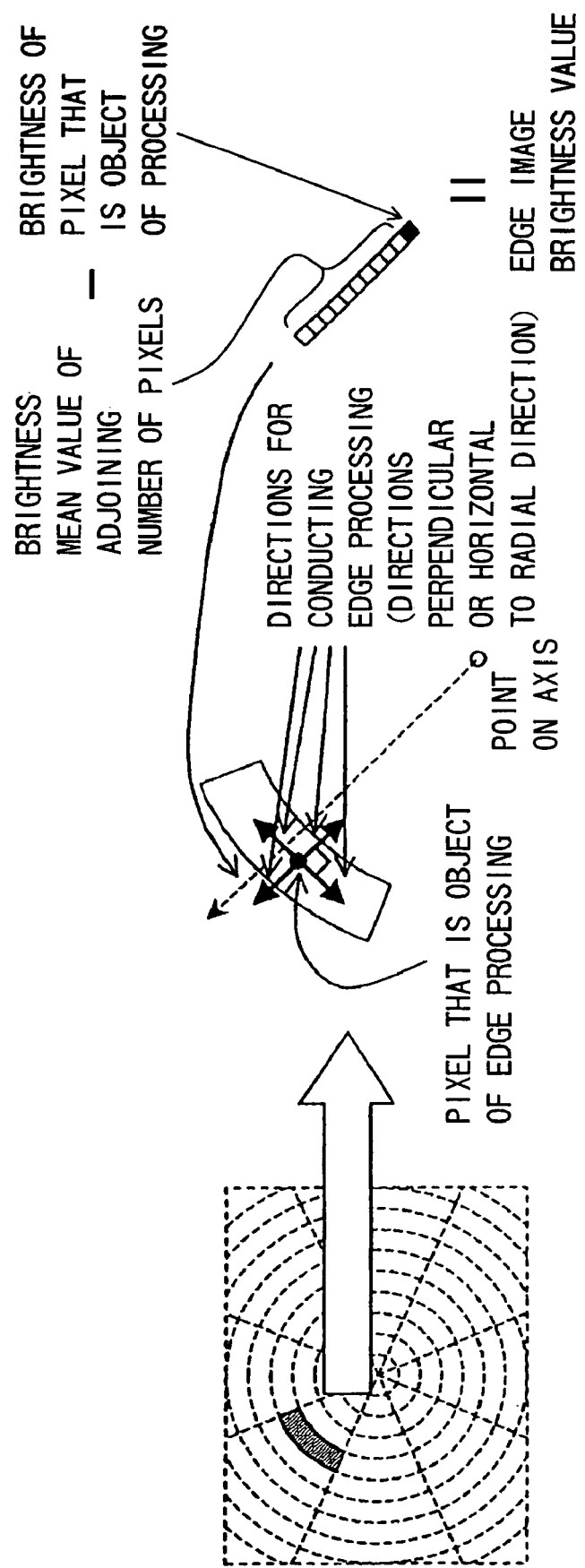
FIG. 18 is a schematic diagram which illustrates edge processing for a pixel as an object of edge processing which belongs to a segmented region.

FIG. 18 shows an outline of edge processing for a given segmented region. In this edge processing, the segmented region in which the pixel that is the object of processing belongs is determined, and four directions are set that comprise two directions of a first line segment drawn from an axial point with respect to the center of that segmented region and two directions of a second line segment which vertically intersects with respect to the first line. Then, the respective differences are determined between the pixel that is the object of processing and the mean values for the brightness of adjoining pixels for a specified number of pixels in the four directions. When the difference is a negative value, zero or a predetermined positive value is set as the difference value. All the difference values that are determined in this manner are added together. The specified number of pixels in the four directions is previously stored on the hard disk 80.

This processing is implemented for all the images of all the color specifications, and when there is a plurality of orders of unwanted diffracted light which caused a flare image to conduct correction processing, edge processing is conducted for each order. Thereafter, in step 404, similarly to Embodiment 1, the obtained edge image is converted into a hue image.

Based on the original image information prior to conducting edge processing, the positions (addresses) of pixels for which brightness is saturated are detected for all color specifications in the original image information. At this time, in step 405, in order to reduce the computation time for processing to detect the presence or absence of a flare image taking a brightness-saturated pixel as a reference point to be performed hereafter, pixel skipping is carried out using a predetermined interval with respect to the detected brightness-saturated pixels to reduce the number of brightness-saturated pixels to conduct processing. The term "predetermined interval" used herein refers to a value which is previously stored on the hard disk 80 or a value which is specified through the processing instructions input interface 70. Further, the pixel skipping rate may be changed for an axial point and a non-axial point.

Subsequently, in steps 407 to 408, processing is conducted to detect the presence or absence of a flare image. Detection of the presence or absence of a flare image is conducted using hue image information which was obtained through edge processing and processing for conversion into hue values, and address information of brightness-saturated pixels obtained through processing to detect brightness-saturated pixels and pixel-skipping processing. The processing in this instance sequentially sets the address information of brightness-saturated pixels that are the object of processing (step 408) and then conducts processing to detect whether or not a flare image was generated by diffracted light of an order that is different to the image-forming order light that was incident on the respective pixel positions. Pixels which are determined as being reference points for generation of flare images are then designated as pixels as flare generation reference points.

Figure 15B:
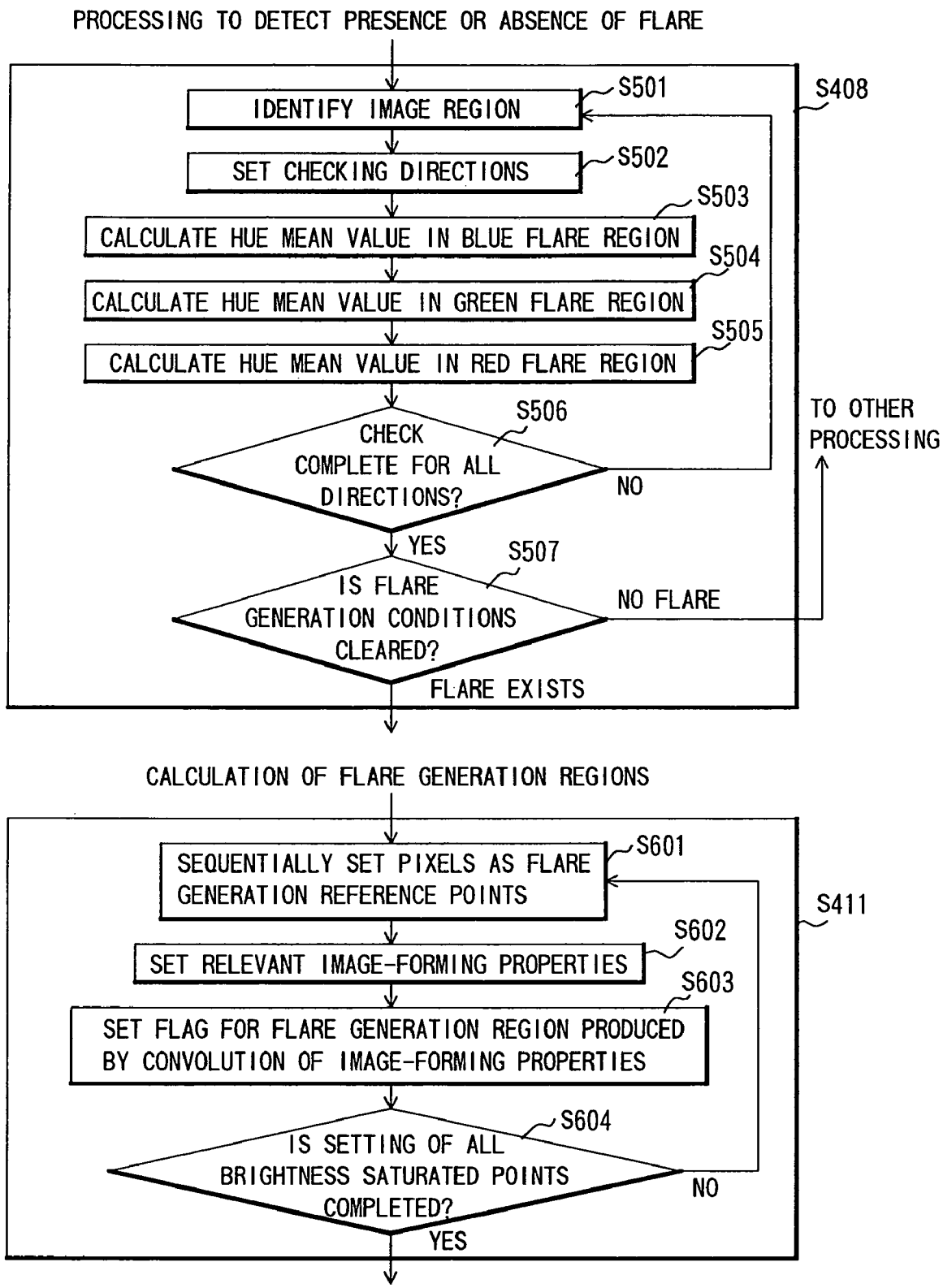
FIG. 15B is a flowchart which shows an image processing program of Embodiment 2.
Figure 19:
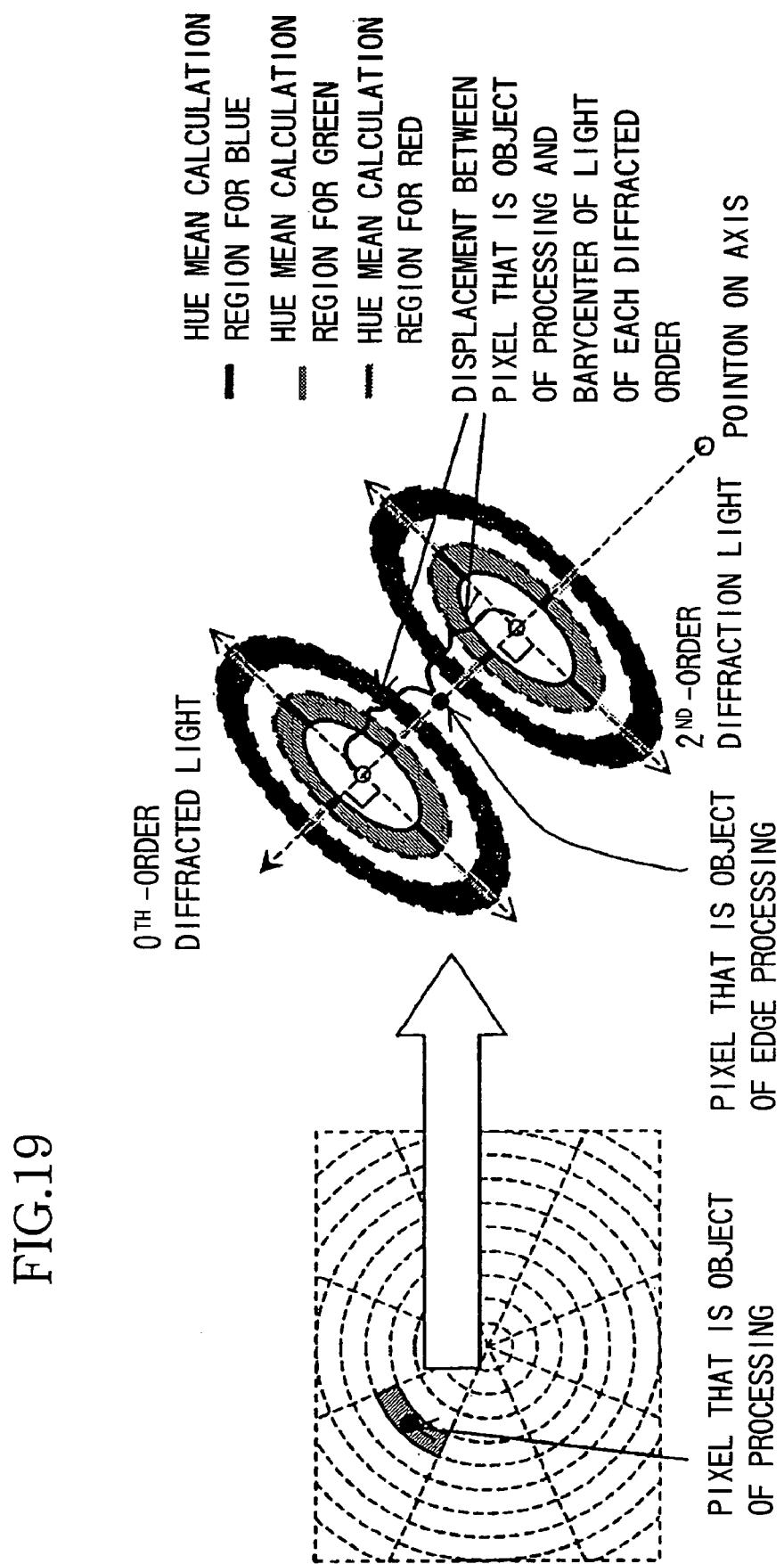
FIG. 19 is a schematic diagram which illustrates processing to detect the presence or absence of a flare image taking as a reference point a target pixel which belongs to a segmented region.

Here, an example of the above processing to detect the presence or absence of a flare image is described using the flowchart in FIG. 15B and FIG. 19. First, in step 501, a brightness-saturated pixel is set as the object for processing, and the segmented region (image region) to which the pixel position belongs is determined.

Next, in step 502, the barycenter position of flare images resulting from light of each diffraction order is obtained taking as a reference the pixel that is the object of processing while referring to the image-forming properties of unwanted diffracted light in that region or the detection parameters. Then, taking that barycenter position as a reference point, the two directions of a line segment that links the axial point and the pixel that is the object of processing are set. Further, taking the barycenter position of flare images resulting from light of each diffraction order as a reference point, two directions are set that pass through that point in the direction of a line segment that is perpendicular to the above line segment.

Next, hue mean values of line segment regions which correspond to an R region, G region and B region when the flare images conducted the above edge processing (steps 503 to 506) are obtained in these four directions that were set, and whether or not these hue values fulfill the conditions of the following formula (2) is then determined.

$$HB\,min < HB < HB\,max$$

$$HG\,min < HG < HG\,max$$

$$HR\,min < HR < HR\,max \quad (2)$$

Where HB, HG and HR are hue mean values in the B, G and R regions, respectively, HB min, HG min and HR min are minimum values (parameter values) in the hue ranges of B, G and R, respectively, and HB max, HG max and HR max are maximum values (parameter values) in the hue ranges of B, G and R, respectively.

The parameter values HB min, HG min, HR min, HB max, HG max and HR max are estimated based on theoretical values or measured values of unwanted diffraction light from the image-taking optical system of the camera which taken the image information being processed, and are parameter values that give the range of hue mean values in each color specification position that could be obtained when edge processing was conducted on flare images resulting from unwanted diffracted light. These parameter values are stored on the hard disk 80.

A test is then conducted as to whether the conditions of formula (2) are fulfilled with respect to the above four directions (steps 505 and 506), and if the conditions are fulfilled in even one of the four directions, and the criterion for light of other diffraction orders that the absolute values of the difference of these order with respect to the image-forming order are equal (for example, when the first order is the image-forming order, the $0^{th}$ order and the $2^{nd}$ order are in a corresponding relationship) (step 507) is also fulfilled, the pixel that is the object of processing is designated as a pixel that is a flare generation reference point. This processing is conducted for all of the target pixels to obtain information regarding pixels as flare generation reference points.

Next, in step 411, processing is conducted to calculate a region in which a flare image is generated. In this processing, a region in which a flare image is generated is specified based on the information regarding pixels as flare generation reference points which was detected in the processing to detect the presence or absence of a flare image.

Determination of a region in which a flare image is generated is conducted sequentially for all pixels as flare generation reference points, in steps 601 to 604 that are shown in FIG. 15B, by performing convolution for a range of images corresponding to the image-forming properties of unwanted diffracted light. At this time, since the image-forming properties of unwanted diffracted light to conduct convolution or the characteristic parameters thereof differ for each diffraction order and image region (segmented region), the image region to which the pixel as a flare generation reference point belongs is determined and information regarding the form of the image-forming properties of the unwanted diffracted light that is the object of correction in that image region can be acquired from the hard disk 80.

Next, in step 412, flare correction processing is conducted only with respect to a flare image region obtained by the processing to determine a region in which a flare was generated. Flare correction processing is processing which reduces color blurring of a flare image resulting from unwanted diffracted light that is particularly conspicuous visually. Specifically, a procedure is conducted in which the hue of a flare image region is converted so as to match the hue of background image region, the saturation is reduced, and the hue and saturation are then filtered with an average filter. Thus, a favorable image (information) is obtained in which the visibility of a flare image component has been reduced with respect to the taken image (original image information).

In step 413, digital signal processing is performed for corrected image information in which a flare image component has been reduced by flare correction processing. At this time, in order to produce a more preferable image as an image for appreciation, various types of image processing are performed, such as brightness/color separation processing, white balance adjustment, gray balance adjustment, density adjustment, color balance adjustment and edge enhancement.

In step 414, image information that has conducted digital signal processing is compressed by a predetermined method of image compression processing. The compressed image information is output to the hard disk 80 and stored.

By means of input operations of a user through the processing instructions input interface 70, image information which has been compressed and stored can be expanded and displayed on the image display section 100 to enable appreciation of the image.

As described in the foregoing, according to this embodiment it is possible to reduce the visibility of a flare image resulting from unwanted diffracted light in a taken image which includes the flare image by use of a computer. Accordingly, even when a camera which comprises an image-taking optical system which includes a diffractive optical element does not have a function which corrects flare images resulting from unwanted diffracted light, a favorable image in which the visibility of a flare image component has been suppressed can be obtained by incorporating into the computer image information which was obtained by taking an image of an object which has highlights with the camera.

The computer as an image processing apparatus or the image processing program that were described in this embodiment are not limited to the structure and functions described above. For example, when detecting the presence or absence of a flare image resulting from unwanted diffracted light, an operation may be performed to establish the correlation between an edge image or an image (hue image) obtained by subjecting information that conducted edge processing to hue conversion, and a hue image or edge image which shows the image-forming properties of unwanted diffracted light that is stored on the hard disk 80, to thereby detect the presence or absence of a flare image.

Further, instead of the above-described color conversion processing (hue conversion, saturation reduction, and hue and saturation smoothing processing) a different kind of correction processing may be conducted as the flare correction processing, such as subtracting the brightness of a flare image and conducting correction.

According to Embodiments 1 and 2 above, since a second image component can be distinguished with respect to a first image component by edge processing, it is possible to facilitate performance of the subsequent processing to specify the region of the second image component and correction processing to reduce the visibility of the second image component.

Thus, by applying this kind of processing to image information which includes a first and second image component that correspond to images formed by diffracted light separated by a diffracting action, processing to specify and correct a region of the second image component which corresponds to an image (flare image) resulting from unwanted diffracted light is made easier and a flare image can be made inconspicuous without imparting an influence on the principal image (first image component).

By conducting edge processing which differs for each segmented region of image information, for example, even when the appearance of a second image component varies in accordance with the angle of view when the image was taken at the time of producing image information (time of image-taking), suitable edge processing can be conducted and it is thus possible to avoid processing to specify an erroneous region of a second image component or correction processing.

Further, by conducting processing which converts image information which conducted edge processing into hue values, handling of the information can be made easier in comparison to a case in which processing to convert the information into hue values is not conducted.

In addition, by detecting a brightness-saturated pixel in image information and specifying a region of a second image component by taking the detected brightness-saturated pixel as a reference point, it is possible to conduct appropriate specification of a region of a second image component and correction processing even with respect to image information which was obtained by taking an image of an object with a high brightness. In particular, by detecting as brightness-saturated pixels those pixels in which brightness is saturated in the image information of all colors from image information for a plurality of colors, such as R, G and B, and selecting the detected pixels as pixels to be references for region specification, the processing load of a computer or an image processing apparatus can be lightened in comparison to a case of conducting region specification processing or the like for all pixels in which brightness is saturated in image information of only some of the colors.

The following image-taking systems, image processing apparatuses and the like may also be mentioned as embodiments of this invention.

(1) A digital image-taking system or image processing apparatus comprising a lens which contains a diffractive optical element which enhances image formation performance, an image-pickup element which converts an image which was formed by the lens into an electrical signal by photoelectric conversion, a signal processing section which optimizes a signal from the image-pickup element into an image signal for display on an image display device, a flare processing section which conducts detection and correction of flare caused by unwanted diffracted light from a diffractive optical element, and a memory section which stores image-forming properties of unwanted diffraction light from a diffractive optical element or information relating thereto.

The image-taking system or image processing apparatus is characterized in that, flare images resulting from unwanted diffracted light are detected or a generated amount thereof is estimated through processing in the flare processing section which converts a taken image into a value which shows a difference in information among pixels or among image regions thereof, and correction of the flare images is conducted based on the results of the detection or estimation of the generated amount.

(2) The image-taking system or image processing apparatus according to (1) above, wherein the processing to convert a taken image into values which show a difference in information among pixels or among image regions thereof is processing which determines a difference among brightness values of each color specification between a pixel that is the object of processing or an image region that is the object of processing and a different pixel or image region, or is processing which converts a differential value for brightness values of each color specification thereof into a hue value.

(3) The image-taking system or image processing apparatus according to (1) or (2) above, wherein the processing which conducts conversion into values which show a difference in information among pixels or among image regions is performed by sequentially setting all pixels or all image regions in a taken image as a pixel that is the object of processing.

(4) The image-taking system or image processing apparatus according to (2) or (3) above, wherein, in the processing which determines a difference in brightness values, a difference is determined between the brightness value of the pixel that is the object of processing and a value obtained using a mean value for brightness in an arbitrary image region in an image region which intersects with a line segment which is extended in an arbitrary direction in an image employing that point as a reference point or a brightness value in the same region.

(5) The image-taking system or image processing apparatus according to any one of (2) to (4) above, wherein the processing which conducts conversion into values which show a difference in information among pixels or among image regions is processing which obtains a total sum of each calculated differential value obtained when processing for differential calculation which determines a difference between a brightness value of a pixel that is the object of the processing and a value obtained using a mean value for brightness in an arbitrary image region in an image region which intersects with a line segment which is extended in an arbitrary direction in an image employing that point as a reference point or a brightness value in the same region was performed for a plurality of arbitrary directions.

(6) The image-taking system or image processing apparatus according to (4) or (5) above, wherein, in the processing which determines a difference in brightness values, when a difference between a brightness value of the pixel that is the object of processing and a value obtained using a mean value for brightness in an arbitrary image region in an image region which intersects with a line segment which is extended in an arbitrary direction in an image employing that point as a reference point or a brightness value in the same region is a negative value, that value is converted to zero or to an arbitrary positive value.

(7) The image-taking system or image processing apparatus according to any one of (1) to (6) above, wherein parameters of the processing which converts a taken image into values which show a difference in information among pixels or among image regions thereof change according to a position in a taken image, setting values of an image-taking system at the time of image-taking, and a diffraction order of unwanted diffracted light produced by the diffractive optical element that is an object of detection.

(8) The image-taking system or image processing apparatus according to (7) above, wherein the setting values of an image-taking system include one or more of the group consisting of: zoom state of the image-taking system at the time of image-taking, diaphragm diameter, lens extension amount, and white balance adjustment amount.

(9) The image-taking system or image processing apparatus according to (7) or (8) above, wherein the parameters of the processing which converts a taken image into values which show a difference in information among pixels or among image regions thereof are, in processing which determines a difference in the brightness values, the size of a region and a relative position from the pixel that is the object of processing of an image region that is the object of brightness value calculation to calculate a difference with a brightness value of the pixel that is the object of processing.

(10) The image-taking system or image processing apparatus according to any one of (7) to (9) above, wherein a size of an image region that is an object of brightness value calculation to calculate a difference with a brightness value of the pixel that is the object of processing is the size of a region which links each point of intersection of a line segment extended in a differential calculating direction from the center of an image forming position in an image-forming diffraction order of a lens comprising a diffractive optical element which is formed on an image-pickup element and a depth of image-forming properties of each color specification of an unwanted diffraction order that is an object of detection, or the size of a region for which a range was modulated based on that region.

(11) The image-taking system or image processing apparatus according to any one of (1) to (10) above, wherein detection or estimation in the flare processing section of a generated amount of flare caused by unwanted diffracted light produced by a diffractive optical element is carried out by conducting a calculation or comparison using image-forming properties of unwanted diffracted light produced by a diffractive optical element or information which was calculated based thereon which is stored in the memory section with respect to an image which conducted processing which converts a taken image into values which show a difference in information among pixels or among image regions thereof.

(12) The image-taking system or image processing apparatus according to (11) above, wherein the information which was calculated on the basis of image-forming properties of unwanted diffracted light produced by a diffractive optical element which is stored in the memory section is information which conducted processing that is the same as the processing which converts a taken image into values which show a difference in information among pixels or among image regions thereof with respect to an image produced by image-forming properties of unwanted diffracted light, or information in which that information was further converted into information which shows characteristics of brightness distribution or hue distribution of each color specification of that information.

(13) The image-taking system or image processing apparatus according to (11) or (12) above, wherein the processing which conducts detection or estimation of a generated amount of flare resulting from unwanted diffracted light is conducted by sequentially setting pixels or image regions in a taken image as a target pixel or a target image region and then employing the set pixel or image region as a reference point.

(14) The image-taking system or image processing apparatus according to any one of (11) to (13) above, wherein high brightness detection processing which detects pixels for which an image brightness value exceeds a constant value in a taken image is performed prior to performing the processing in the flare processing section which conducts detection or estimation of a generated amount of flare resulting from unwanted diffracted light produced by a diffractive optical element, and the processing which detects or estimates a generated amount of flare resulting from unwanted diffracted light produced by a diffractive optical element is conducted taking only high brightness pixels which were detected in the high brightness detection processing as pixels that are objects of calculation.

(15) The image-taking system or image processing apparatus according to (13) to (14) above, wherein an image brightness which is defined as a high brightness in the high brightness detection processing is a value at which image brightness is saturated.

(16) The image-taking system or image processing apparatus according to any one of (13) to (15) above, wherein, for the processing which carries out detection or estimation of a generated amount of flare resulting from unwanted diffracted light, processing which detects flare resulting from unwanted diffracted light is performed after conducting pixel skipping at an arbitrary rate in an image region that is an object of detection or skipping of image regions.

(17) The image-taking system or image processing apparatus according to any one of (11) to (16) above, wherein the processing in the flare processing section which carries out detection or estimation of a generated amount of flare resulting from unwanted diffracted light produced by a diffractive optical element is performed, when taking a point that is the object of processing as a reference point, by computing, or comparing with information stored in the memory part, a brightness distribution of each color specification in an image region which is in a predetermined position in a predetermined direction from the reference point, or values calculated using brightness, or values calculated using hue distribution or hue value.

(18) The image-taking system or image processing apparatus according to (17) above, wherein a direction from the reference point that is the object of processing is any direction of the group consisting of an upward direction, downward direction, left direction and right direction of the image information, an external direction of a radius vector which takes as a reference an axial point in the taken image, an internal direction of the radius vector, and a clockwise direction and counter-clockwise direction in a direction which intersects perpendicularly with a radius vector direction, or a combination of these.

(19) The image-taking system or image processing apparatus according to (17) to (18) above, wherein the predetermined position in a predetermined direction which takes the point that is the object of processing as a reference point is a region which links a line segment extended in the predetermined direction taking as a reference point the center of an image forming position of an image-forming diffraction order which was produced by the diffractive optical element and each point of intersection of a depth of image-forming properties of each color specification of an unwanted diffraction order that is a detection object, or a region for which a range was modulated based on that region.

(20) The image-taking system or image processing apparatus according to any of (17) to (19) above, wherein the processing in the flare processing section which detects flare resulting from unwanted diffracted light produced by a diffractive optical element is processing which compares hue values in predetermined positions that are different to each other in a predetermined direction which takes the point that is the object of processing as a reference point in an image, and when a difference in the hue values is larger than information stored in the memory section the processing determines that a flare resulting from unwanted diffracted light has been generated, or is processing which determines that a flare resulting from unwanted diffracted light has been generated when one or a plurality of hue values in predetermined positions that are different to each other in a predetermined direction which takes the point that is the object of processing as a reference point in an image is within a range of information stored in the memory part.

(21) The image-taking system or image processing apparatus according to any one of (17) to (20) above, wherein the processing in the flare processing section which estimates a generated amount of flare resulting from unwanted diffracted light produced by a diffractive optical element is processing which compares hue values in predetermined positions that are different to each other in a predetermined direction which takes the point that is the object of processing as a reference point in an image and estimates a generated amount of flare resulting from unwanted diffracted light by comparing a difference in hue values among predetermined color specifications with information stored in the memory part, or is processing which estimates a generated amount of flare resulting from unwanted diffracted light by comparing hue values in predetermined positions that are different to each other in a predetermined direction which takes the point that is the object of processing as a reference point in an image with information which is stored in the memory part.

(22) The image-taking system or image processing apparatus according to (17) above, wherein, in the processing in the flare processing section which detects flare resulting from unwanted diffracted light produced by a diffractive optical element, the presence or absence of flare generation is detected by calculating hue distribution characteristics in the direction of a radius vector which takes the point that is the object of processing as a reference point, or a hue mean value for an arbitrary radius vector region, or a hue mean value for a plurality of arbitrary radius vector regions that are different to each other, and then comparing the distribution characteristics or the hue mean value with information stored in the memory part.

(23) The image-taking system or image processing apparatus according to any one of (17) to (21) above, wherein, in the processing in the flare processing section which detects flare resulting from unwanted diffracted light produced by a diffractive optical element, the presence or absence of flare generation is detected by combining processing which conducts detection of the presence or absence of a flare, when taking the point which is the object of processing as a reference point, by comparing a value which is calculated using a hue value or hue distribution in an image region in a predetermined position in a predetermined direction from the reference point with information stored in the memory part, and processing which detects the presence or absence of a flare by calculating hue distribution characteristics in a direction of a radius vector which takes the point that is the object of processing as a reference point, or a hue mean value for an arbitrary radius vector region, or a hue mean value for a plurality of arbitrary radius vector regions that are different to each other, and then comparing the distribution characteristics or the hue mean value with information stored in the memory part.

(24) The image-taking system or image processing apparatus according to any one of (17) to (23) above, wherein the predetermined position in a predetermined direction which takes the point that is the object of processing as a reference point in the processing which detects or estimates a generated amount of flare resulting from unwanted diffracted light and the information stored in the memory section which is used as a comparison amount at the time of estimation of a generated amount or detection vary in accordance with a position on an image surface in which the point that is the object of processing belongs.

(25) The image-taking system or image processing apparatus according to any one of (17) to (24) above, wherein a region which is an object to conduct correction of flare resulting from unwanted diffracted light is obtained by setting, with respect to the pixel that is the object of processing or the image region that is the object of processing for which it was determined that a flare was generated, a region in that position that is stored inside the memory, or a region of image-forming properties of a flare resulting from unwanted diffracted light of a diffraction order which is taken as an object for correction which belongs to that position, or a region specified by information obtained therefrom.

(26) The image-taking system or image processing apparatus according to (25) above, wherein, in the processing which sets, with respect to the pixel that is an object of processing or the image region that is an object of processing for which it was determined that a flare was generated, a region in that position that is stored inside the memory, or a region of image-forming properties of a flare resulting from unwanted diffracted light of a diffraction order which is taken as an object for correction which belongs in that position, or a region specified by information obtained therefrom, the pixel that is an object of processing or the image region that is an object of processing is matched with the center of an image-forming position of an image-forming diffraction component, and based on the relative positional relationship with the image-forming diffraction component, a region of image-forming properties of a flare resulting from unwanted diffracted light of a diffraction order which is taken as an object for correction or a region specified by information obtained therefrom is set.

(27) An image processing method or program which comprises flare processing which conducts detection and correction of image-forming properties of unwanted diffracted light produced by a diffractive optical element or of flare resulting from unwanted diffracted light produced by a diffractive optical element using information relating thereto with respect to an electronic image which was obtained through means which forms an image of an object via an optical system which comprises a diffractive optical element which enhances image formation performance, wherein, through processing in the flare processing which converts a taken image into values which show a difference in information between pixels or between image regions thereof, detection or estimation of a generated amount of flare resulting from unwanted diffracted light produced by a diffractive optical element is conducted, and correction of flare resulting from unwanted diffracted light produced by a diffractive optical element is then conducted based on the results of the detection or estimation of the generated amount of flare resulting from unwanted diffracted light.

(28) The image processing method or program according to (27) above, wherein the processing which converts a taken image into values which show a difference in information between pixels or between image regions thereof is processing which determines a difference in brightness values for each color specification between a pixel that is the object of processing or an image region that is the object of processing and a different pixel or image region, or is processing which converts differential values for the brightness values for each color specification into a hue value.

Embodiment 3

Figure 20:
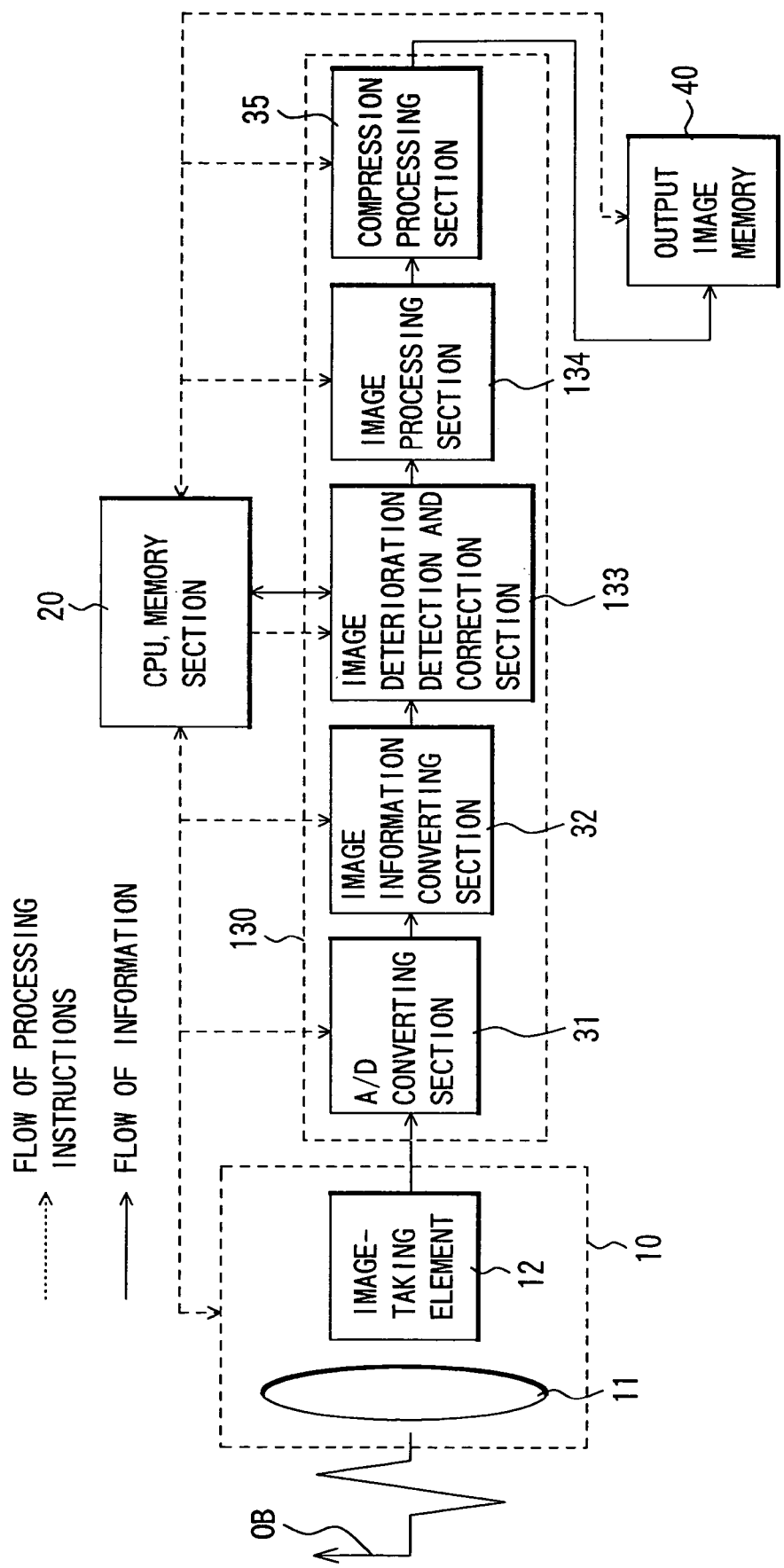
FIG. 20 is a block diagram which shows the structure of an image-taking system as Embodiment 3 of this invention.
Figure 22:
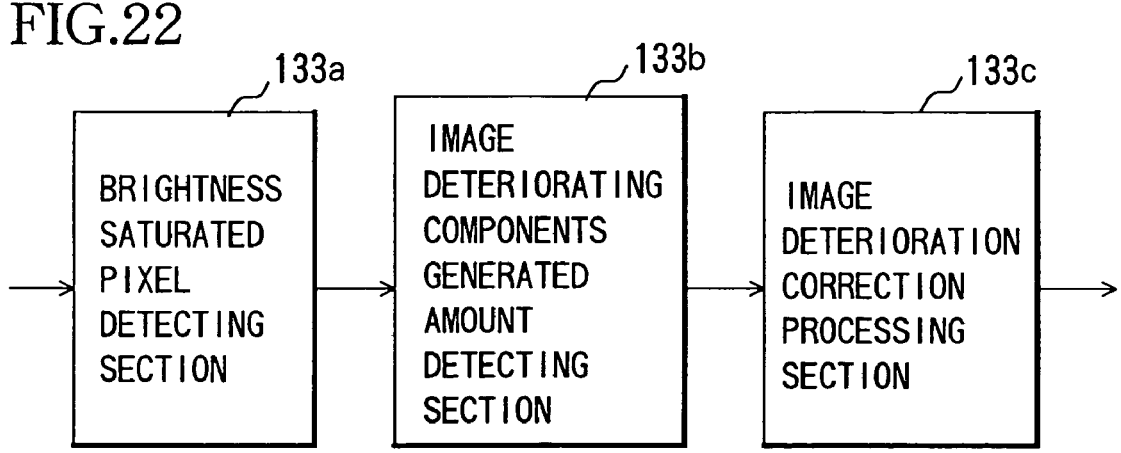
FIG. 22 is a system block diagram of the image deterioration detection and correction section in FIG. 20.

FIG. 20 and FIG. 22 show system block diagrams of a digital still camera as an image-taking system which includes an image processing apparatus as Embodiment 3 of this invention. In FIG. 20, arrows with a dotted line indicate the flow of processing instructions and arrows with a solid line indicate the flow of information. In FIG. 20 and FIG. 22, components which are common with Embodiment 1 have been assigned the same symbols as the corresponding components in FIGS. 4 and 6.

The image-taking system has an optical system 11 which includes a diffractive optical element, an image-taking section 10 which comprises an image-pickup element 12 which is composed by a photoelectric conversion element such as a CCD sensor or CMOS sensor, and a controller (CPU and memory) 20 which issues driving instructions for the overall image-taking system and also stores various information other than image information.

The image-taking system also has an electrical signal processing section 130 which includes an A/D converting section 31, an image information converting section 32, an image deterioration detection and correction section 133, an image processing section 134 and a compression processing section 35. The electrical signal processing section 130 converts a signal obtained by the image-taking section 10 (image information) into a displayable image signal. Moreover, the image taking system has an output image memory 40 which stores output images.

To reduce image deterioration caused by diffraction images of unwanted orders produced by a diffractive optical element of the optical system 11, the image deterioration detection and correction section 133 has, as shown in FIG. 22, a brightness-saturated pixel detecting section 133a which recognizes a pixel of the image-pickup element 12 in which an electrical signal is saturated, an image-quality deteriorating components generated amount detecting section 133b which detects or estimates a generated amount of diffracted light of unwanted orders by taking as a reference point a pixel recognized as a pixel in which a signal is saturated, and an image deterioration correction processing section 33c which reduces image deterioration caused by flare light of unwanted orders based on the detected amount of diffracted light of unwanted orders.

The optical system 11 includes a diffraction lens (DOE lens) in which a layer-type diffractive optical element shown in FIG. 1 was introduced. By use of a first-order diffracted light component of this diffraction lens, the optical system 11 can favorably correct chromatic aberration and provide enhanced image formation performance while retaining a compact size. Since unwanted diffracted light, which is diffracted light other than the diffracted light component, can also be favorably reduced, as long as an object is one of a light intensity that is within the dynamic range of brightness of the digital camera of this embodiment, flares resulting from unwanted diffracted light can be corrected to a level at which they are completely unrecognizable visually.

Figure 21:
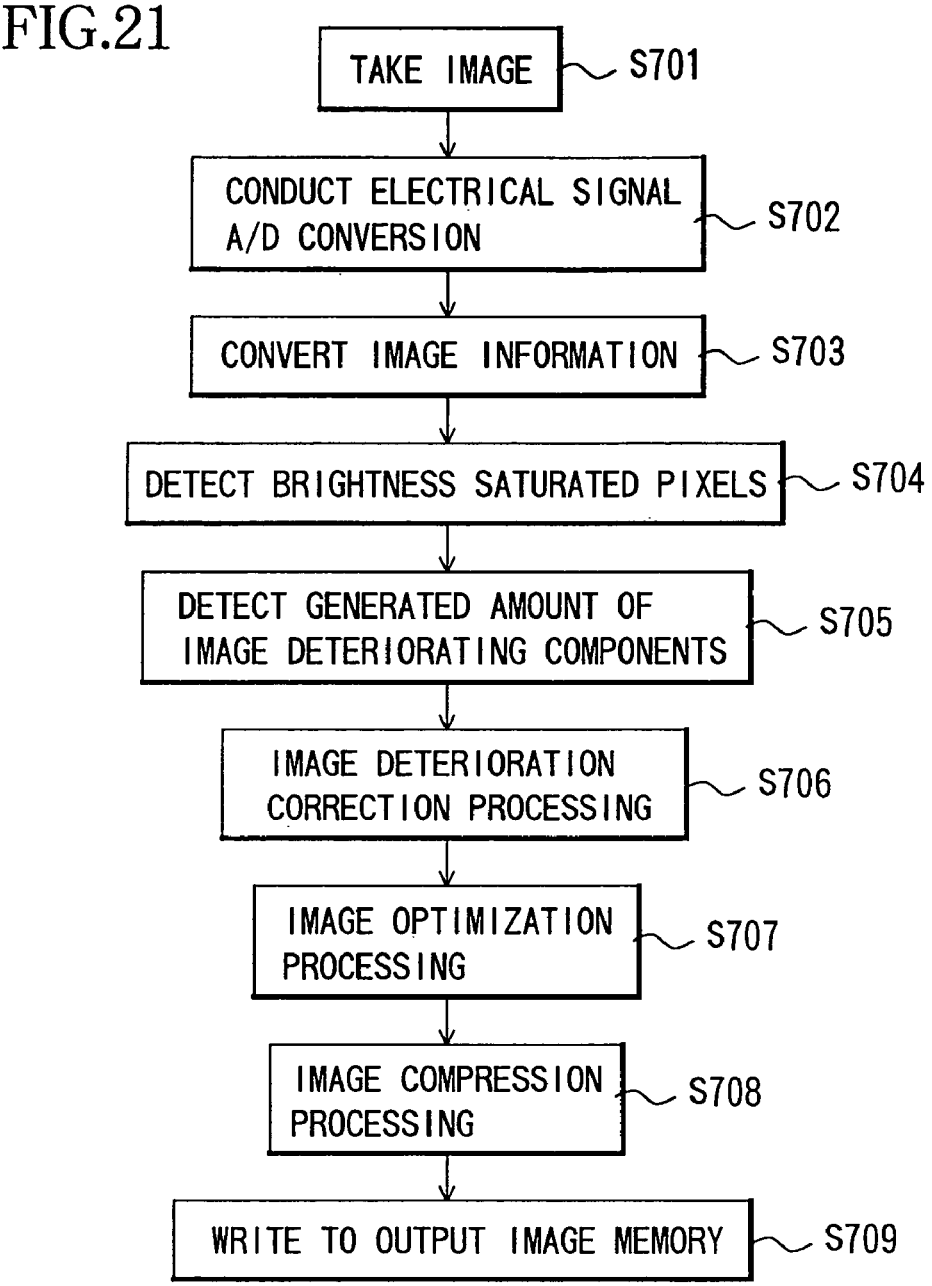
FIG. 21 is a flowchart of signal processing when image-taking is conducted of an object which includes a highlight using the image-taking system of FIG. 20.

FIG. 21 shows a flowchart of a signal processing program of a digital camera of this embodiment. Using this flowchart, a series of signal processing operations when an image was taken of an object which includes highlights that can generate flares due to unwanted diffracted light by use of the digital camera of this embodiment will be described in order.

When the shutter of the digital camera is released, the image-taking section 10 takes an image of an object by projecting the object onto a light-receiving surface of the image-pickup element 12 by use of the optical system 11 via an instruction of the controller 20. The optical system 11 in this case is a system with a zoom function and an adjustable diaphragm and it has a function that can detect a zoom state and aperture amount at the time of image-taking via a detector (not shown).

The image-pickup element 12 is a single-plate type photoelectric conversion element which converts a light signal produced by an image formed on a light-receiving surface into an electrical signal for each light receiving element (pixel) which corresponds to a given position. The image-pickup element 12 also has a function which conducts color separation by use of respective filters for red, green and blue which are disposed in a systematic array on the pixels of a light-receiving part thereof.

The exposure time and timing for acquiring an object image of the image-pickup element 12 at the time of image-taking are controlled by the controller 20, and information of an acquired image is transferred as an electrical signal to the electrical signal processing section 30 following an instruction from the controller 20.

An image signal which was transferred to the electrical signal processing section 30 is first transferred to the A/D converting section 31. The image signal is converted into digital information by the A/D converting section 31 and then transferred to the image information converting section 32. The digital information is converted into image (gradation) information by the image information converting section 32. Since the image information here contains information for only one color specification on each pixel in correspondence to an array of R, G and B color filters, as shown in FIG. 23, information can be obtained for all the pixels of each color specification system by conducting pixel interpolation for each color specification. Thus, independent image information is created for each color specification system.

Any format may be used for the pixel interpolation processing at this time as long as it does not impart nonlinearity to the brightness of the image information.

The thus obtained image information of each color specification is transferred to the image deterioration detection and correction section 133.

As shown in FIG. 22, the image deterioration detection and correction section 133 has a brightness-saturated pixel detecting section 133a, an image-quality deteriorating components generated amount detecting section 133b, and an image deterioration correction processing section 133c. The image information of each color specification which was transferred from the image information converting section 32 is first transferred to the brightness-saturated pixel detecting section 133a. The brightness-saturated pixel detecting section 133a detects pixels for which brightness saturation of image information has occurred for each color specification system, and stores the addresses of these pixels in the controller 20.

After conducting the above processing to detect brightness-saturated pixels in each color specification system, the brightness-saturated pixel detecting section 133a refers to the addresses of brightness-saturated pixels in each color specification system and extracts only pixel addresses for which image brightness is saturated in all of the color specification systems, and stores these addresses in the controller 20. At this point, the aforementioned addresses of brightness-saturated pixels in each color specification are deleted.

In the subsequent processing, the amount of flares generated by unwanted diffracted light is detected by employing the pixels (pixel addresses) in which brightness saturation has occurred in all of the color specification systems as reference points, and thereafter DOE flares (flares resulting from the diffractive optical element) are corrected.

The reason correction is conducted by employing only pixel addresses in which image brightness is saturated in all the color specification systems as reference points is that, in most cases, an object which emits a light quantity that is strong enough to produce flares due to unwanted diffracted light emits white light which has an extremely high brightness in comparison to peripheral objects such as sunlight or electric lighting used at night. When highlights from this type of light source are incident on an image-taking apparatus, even if the color of the light source is tinged with red or blue, the spectral characteristics of the light source have an edge structure in a blue or red wavelength region.

When highlights are incident thereon to a degree such that flares resulting from unwanted diffracted light are generated, the spectral characteristics of this edge region also result in a light quantity of a degree whereby brightness saturation occurs. Therefore, by conducting correction as described above employing only pixels in which brightness is saturated in all the color specification systems as reference points, it is possible to eliminate unnecessary processing which takes as a target pixel a pixel for which brightness happens to be saturated in a given color specification even though a highlight is not incident to a degree whereby a flare is generated by unwanted diffracted light.

After storing the brightness-saturated pixel addresses detected by the brightness-saturated pixel detecting section 133a in the controller 20, the image information is transferred to the image-quality deteriorating components generated amount detecting section 133b. At this time, processing is conducted which estimates the brightness of flares generated in an image by employing the brightness-saturated pixel addresses as reference points. Prior to this processing, in order to obtain image characteristics of DOE flares resulting from unwanted diffracted light to be used for the estimation, information stored in the controller 20 is transferred to the image-quality deteriorating components generated amount detecting section 133b.

The controller 20 first determines each state (zoom state, f-number) of the optical system 11 at the time of image-taking, and transfers lens information of corresponding states which is stored in the internal memory of the controller 20 to the image-quality deteriorating components generated amount detecting section 133b. The transferred information is information regarding image-forming properties of unwanted diffraction light of each color specification system at each image height position on an image surface for the zoom state and f-number of the optical system 11 at the time of image-taking and information regarding a distance between a principal ray and light of an image-forming order at that time.

FIG. 24 shows a schematic diagram of images produced by unwanted diffracted light on an image surface (on the surface of the image-pickup element 12). FIG. 24(A) shows first-order diffracted light as image-forming light at an axial point and patterns of unwanted diffracted light of the orders of 0, 2, −1 and 3 at an axial point. FIG. 24(B) shows first-order diffracted light at an off-axis point and patterns of unwanted diffracted light of the orders of 0, 2, −1 and 3. Images resulting from unwanted diffracted light produced by a DO lens are largely defocused from an image surface, although depending on the structure of an optical system, and thus they form concentric circular images at an axial point as shown in FIG. 24(A), and elliptical images at an off-axis point as shown in FIG. 24(B). At an off-axis point, for the principal ray coordinates or barycentric coordinates of each unwanted diffracted light, an image is formed having a fixed interval with the principal ray coordinates or barycentric coordinates of the image-forming light. This interval is defined with respect to image height.

Since the optical system 11 is rotationally symmetric, these properties of images produced by unwanted diffracted light and intervals between barycentric coordinates of image-forming light and unwanted diffracted light or intervals between principal rays, are constant with respect to an image height direction even if there is an azimuth.

Thus, by retaining ellipticity with respect to image-forming properties of each unwanted diffraction order at an axial point of each color specification system, a signed barycentric coordinate interval of each unwanted diffracted light and image-forming light at a plurality of representative points of image height, and the compression of the axial image-forming properties of each unwanted diffracted light, the image-forming properties of unwanted diffracted light can be expressed as information of unwanted diffracted light using a small amount of memory.

Further, while the image-forming properties of unwanted diffraction orders at an axial point may be properties obtained by creating image information based on a two-dimensional point spread function, since the image is rotationally symmetric, by employing function expression information of an image cross-section taking the center point as an reference point a further saving of memory is enabled.

In addition, the image properties of unwanted diffracted light may be maintained for each color specification system by assigning weights to image-forming properties which are obtained for each single wavelength by use of the product of various spectral characteristics of the image-taking system (optical system 11, various transparent filters, spectral sensitivity of a sensor, transmission characteristics of color separation filters, and the like) and the diffraction efficiency wavelength characteristics of the diffractive optical element of the optical system 11, as well as typical daylight spectral characteristics or lamp properties (spectral characteristics of illumination light source) as the properties of the light source.

Figure 25:
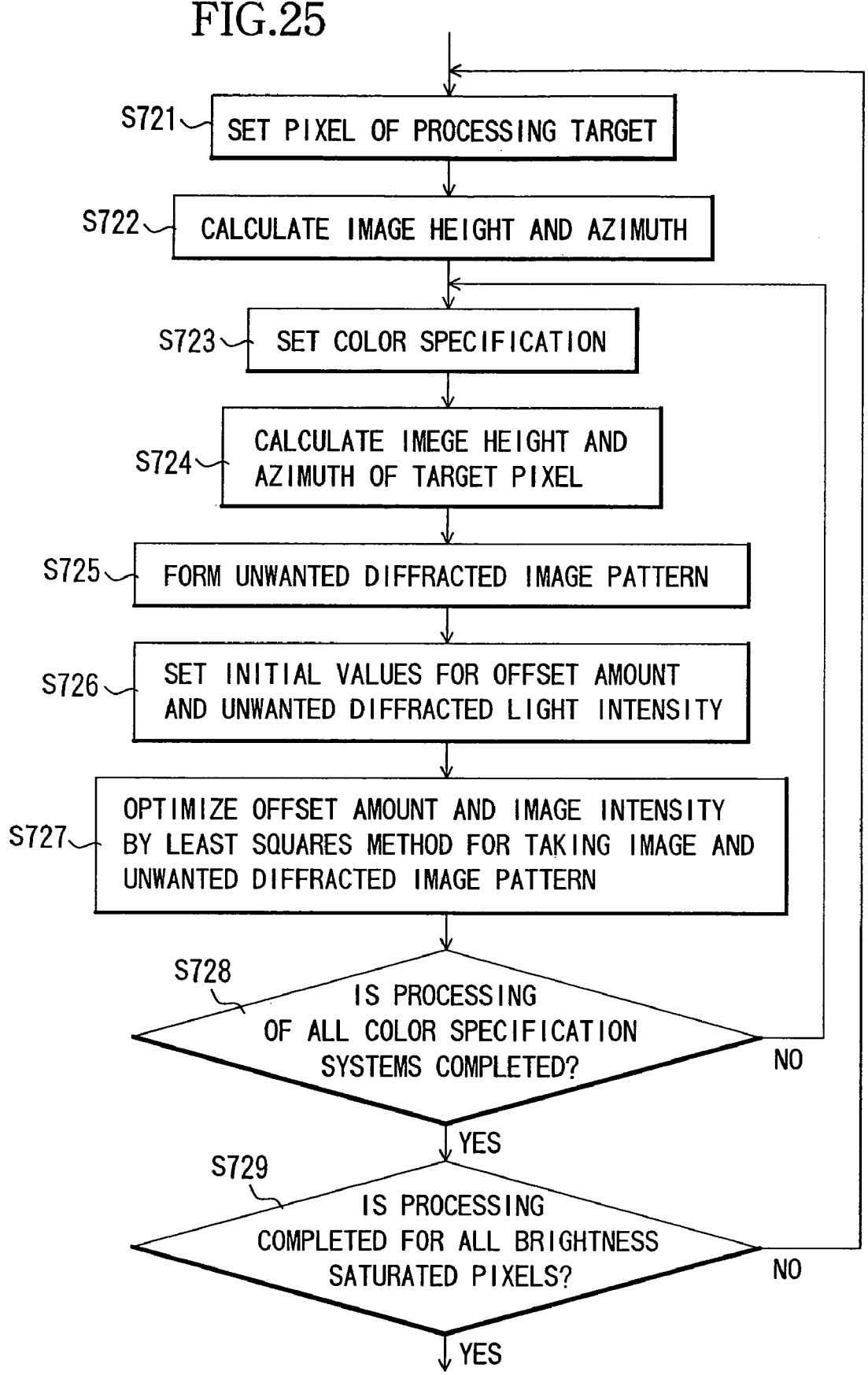
FIG. 25 is a flowchart of the image-quality deteriorating components generated amount detecting section 133b in FIG. 22.

While either a design value or measured value may be used for these spectral characteristics and diffraction efficiency wavelength characteristics, with respect to diffraction efficiency, since a difference is liable to arise among individual products, preferably the diffraction efficiency wavelength characteristics are acquired for each product and the image properties of unwanted diffracted light are then calculated, FIG. 25 shows the flow of operations to detect a generated amount of unwanted diffracted light in the image-quality deteriorating components generated amount detecting section 133b. Hereunder, these operations will be described referring to the flowchart in FIG. 25. The image-quality deteriorating components generated amount detecting section 133b first refers to addresses of brightness-saturated pixels which are stored in the controller 20, and then performs signal processing respectively for each brightness-saturated pixel. The image height and azimuth is calculated from the target pixel address, and a pattern of an image resulting from unwanted $0^{th}$ order diffraction light is formed as an image template in consideration of divergence of coordinates from the barycenter of image forming light. A new image template is then created by assigning thereto the brightness of the above image template, that is, the maximum brightness of the image resulting from unwanted diffracted light, and an initial value for brightness offset, and a difference with a corresponding region in the taken image is then determined, to thereby determine the brightness of unwanted diffracted light with which the least squares are obtained employing as parameters the brightness of the unwanted diffracted light and the offset amount.

Figure 26:
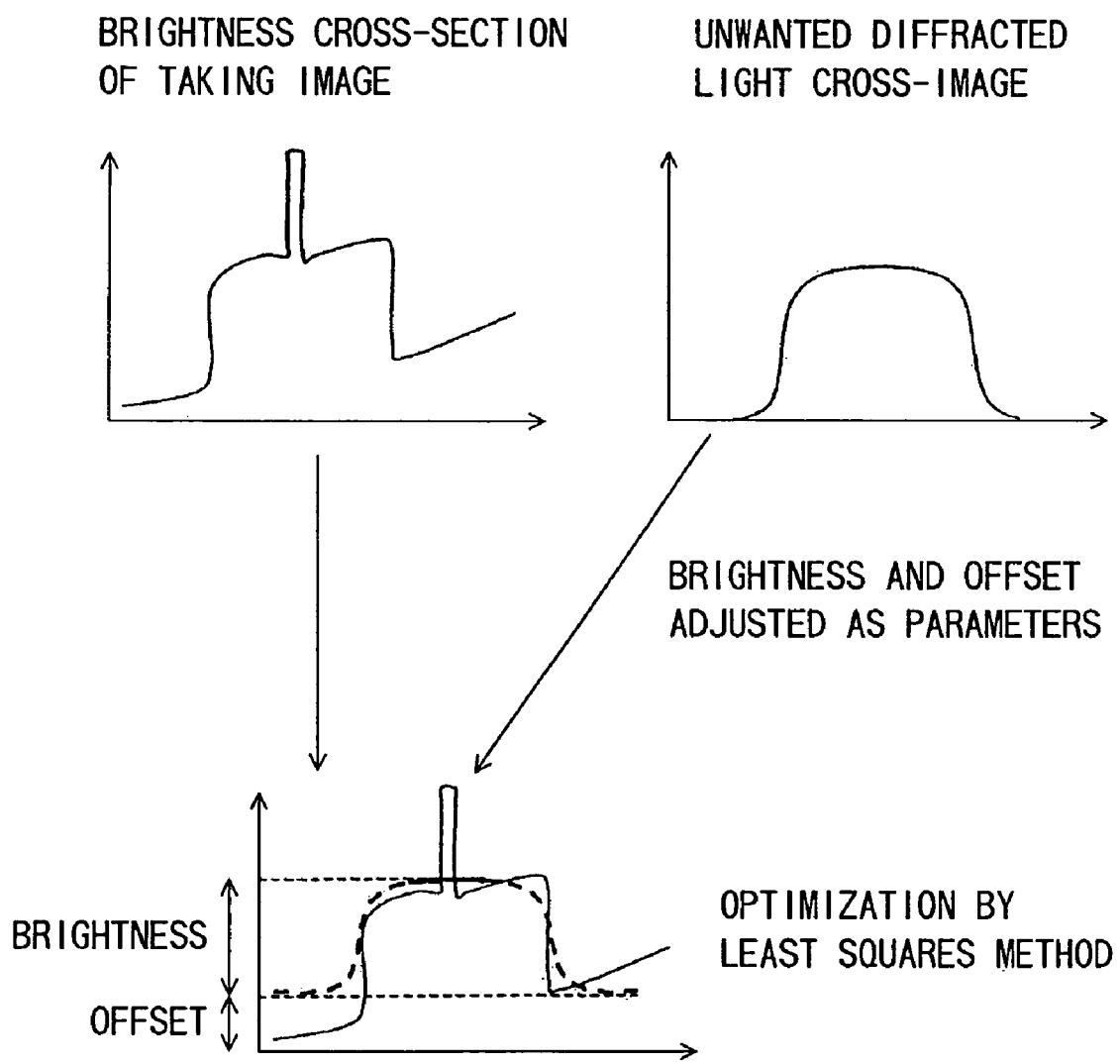
FIG. 26 is a schematic diagram of a brightness cross-section in processing which determines the brightness of unwanted diffraction light and an offset amount in FIG. 25.

FIG. 26 shows schematic diagrams of brightness cross-sections for that processing. The positioning of the taken image and template image may be conducted by positioning the images such that the barycenter position of the image-forming light and the address of the brightness-saturated pixel that is the object of processing correspond. By conducting this processing for each color specification and for all the target pixels, the generated amount of flare resulting from unwanted diffracted light for each color specification at all of the brightness-saturated pixels is obtained. This value is transferred to the controller 20 and stored therein.

In the above processing, although an optimal value was calculated that has the brightness of unwanted diffracted light and a brightness offset as parameters, to speed-up the computational convergence, brightness offset may be assigned by referring to the brightness value of a region which borders the edge of unwanted diffracted light in the taken image. Further, although brightness offset was assigned to the template as a fixed value, it may have a gradient which varies linearly or nonlinearly with respect to an image position corresponding to the brightness value of a taken image which borders a flare edge. Also, while the least squares method was used for optimization of the parameters, another method may be used as long as it is processing that can effectively optimize the parameters.

A step may also be added which makes it possible to avoid erroneous correction processing when a flare was not generated by creating an image template with the obtained brightness value of the unwanted diffracted light and brightness offset value, acquiring a brightness correlation value with the corresponding region of a taken image, and determining that a flare was generated by unwanted diffracted light when the brightness correlation value is greater than a set value, and when the brightness correlation value is not greater than the set value the brightness value is set to 0 to indicate that a flare was not generated by unwanted diffracted light.

In addition, processing to estimate the intensity of a generated amount of unwanted diffracted light need not be conducted with respect to a pixel for which brightness is saturated in a taken image. Thereby, it is possible to prevent deterioration of computational accuracy.

Figure 27:
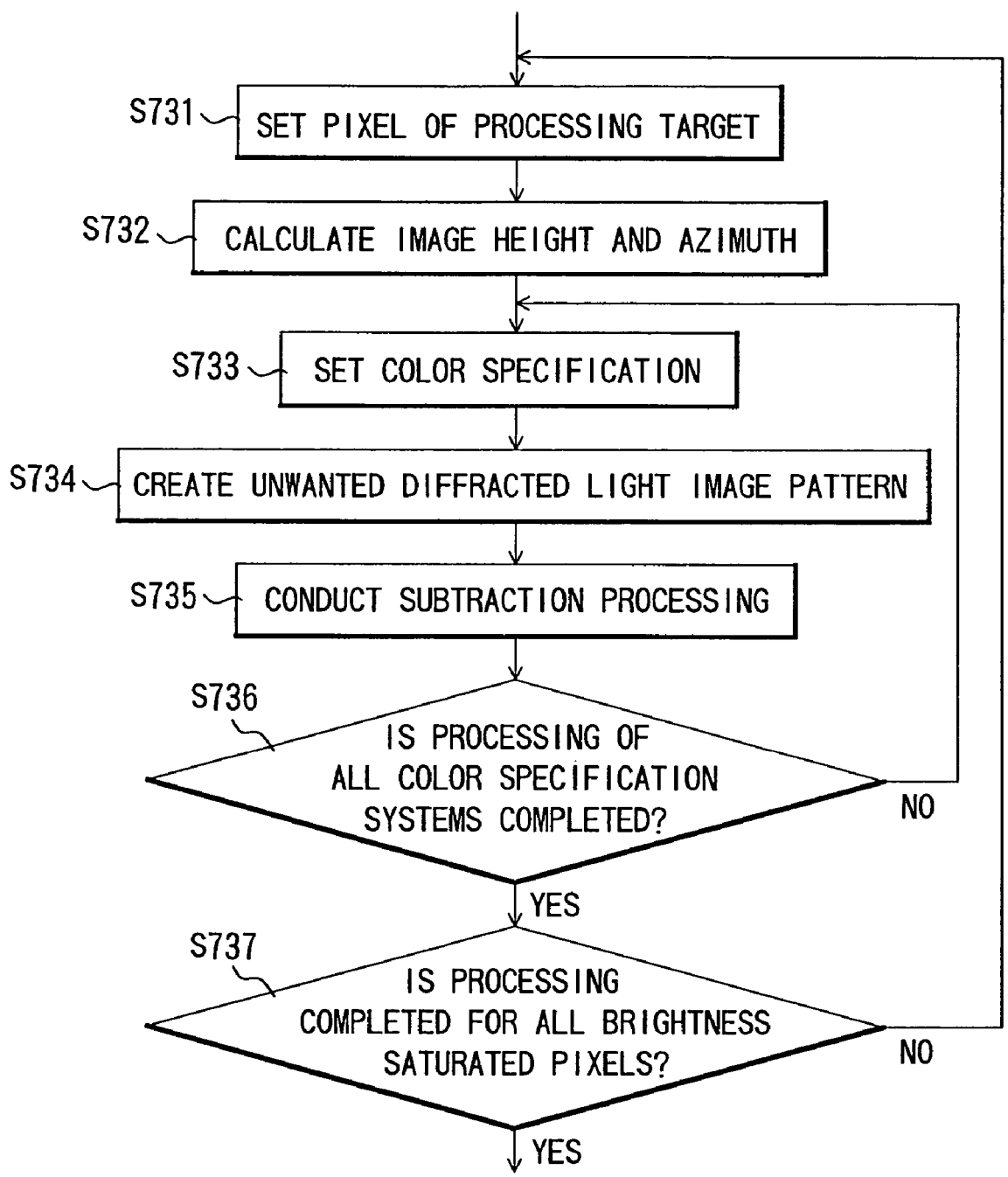
FIG. 27 is a flowchart of an image deterioration correction processing section in FIG. 22.

After the flow of operations to detect a generated amount of unwanted diffracted light is completed in the image-quality deteriorating components generated amount detecting section 133b, the image information is transferred to the image deterioration correction processing section 133c. The flow of processing in the image deterioration correction processing section 133c to remove unwanted diffracted light is shown in FIG. 27.

The image deterioration correction processing section 133c conducts processing respectively for each brightness-saturated pixel by referring to the addresses of brightness-saturated pixels which were stored in the controller 20. The image deterioration correction processing section 133c sets target pixel addresses, and then calculates image height and azimuth. The color specification that is the object of processing is decided and a template for subtraction processing for subtracting the generated unwanted diffracted light is created by positioning a pattern of an image of unwanted $0^{th}$ order diffraction light in consideration of divergence of coordinates from the barycenter of image forming light and multiplying by the generated amount of unwanted diffracted light obtained by the above flow of operations to detect a generated amount of unwanted diffracted light. That template for subtraction is subtracted from the target position of the taken image. This processing is conducted for the entire color specification system and for all target pixels to remove the flares caused by unwanted diffracted light.

Although only flares caused by unwanted diffracted light produced by $0^{th}$ order diffraction light were detected and subtracted in the above processing, processing may be added to detect and subtract flares caused by unwanted diffracted light of a higher order. Further, a decision as to whether or not to conduct processing for unwanted diffracted light of a high order may be made based on a generated amount of unwanted diffracted light of a low order. When a brightness-saturated pixel is not detected in the brightness-saturated pixel detecting section 133a, the processing to detect a generated amount of flare resulting from unwanted diffracted light in the image-quality deteriorating components generated amount detecting section 133b and the processing to subtract flares resulting from unwanted diffracted light in the image deterioration correction processing section 133c are preferably skipped.

As described above, in this embodiment, processing by the brightness pixel detecting section 133a, the image-quality deteriorating components generated amount detecting section 133b and the image deterioration correction processing section 133c is performed prior to nonlinear processing by the electrical signal processing section 130.

The nonlinear processing at this time includes either γ conversion processing or brightness/color separation processing, or both thereof.

After the processing in the image deterioration detection and correction section 133, the image information is transferred to the image processing section 134 where it conducts various kinds of image processing, such as brightness/color separation processing, white balance adjustment, gray balance adjustment, density adjustment, color balance adjustment and edge enhancement, to produce an image that is more preferable as an image for appreciation.

Image information which conducted image processing in the image processing section 134 is then transferred to the compression processing section 35 and compressed according to a predetermined method of image compression processing. Any method may be used as the image compression method as long as the method is capable of compressing image information, and examples thereof include JPEG, TIFF and JPEG 2000. The compressed image is transferred to the output image memory 40 as an output image and stored therein.

The output image memory 40 which stores an output image is a removable memory with respect to the image-taking system, and an output image can be directly transferred to a different information terminal device via this memory. The output image memory 40 is a rewritable memory, and may be of any form, and examples thereof include a card-type memory such as Compact Flash (registered trademark), smart media, memory stick, PC card and ATA card, and a general-purpose memory such as MO disk, floppy (registered trademark) disk, ZIP, CD-R, CD-RW, DVD-RAM, DVD-R, and DVD-RW.

By using the digital still camera of the above-described Embodiment 3, even in a case where a diffractive optical element has been introduced into the optical system to enhance image formation performance, a compact and high performance digital camera can be obtained which can satisfactorily remove flares resulting from unwanted diffracted light caused by the diffractive optical element even when taking an image of an object which has a highlight.

More specifically, even when flares resulting from unwanted diffracted light are generated in a taken image which is an image that was taken of a highlight light (object of high brightness) using an optical system which includes a diffractive optical element, image deterioration correction processing is conducted in which the positions of pixels for which brightness was saturated are detected, a generated amount of an image-quality deteriorating component is then detected or estimated by employing the brightness-saturated pixels as reference points, and based on the generated amount, image-quality deteriorating components generated in regions surrounding the brightness-saturated pixels are removed or reduced or made visually inconspicuous. Thus, a compact and high performance digital camera can be obtained which can favorably correct image deterioration caused by flare light.

The digital still camera of Embodiment 3 is not limited to the embodiment described above and, for example, the image-pickup element may be a single-plate type device or a three-plate type device, or may be of a different specification thereto. Further, this invention can also be applied to a digital video camera.

Embodiment 4

Figure 28:
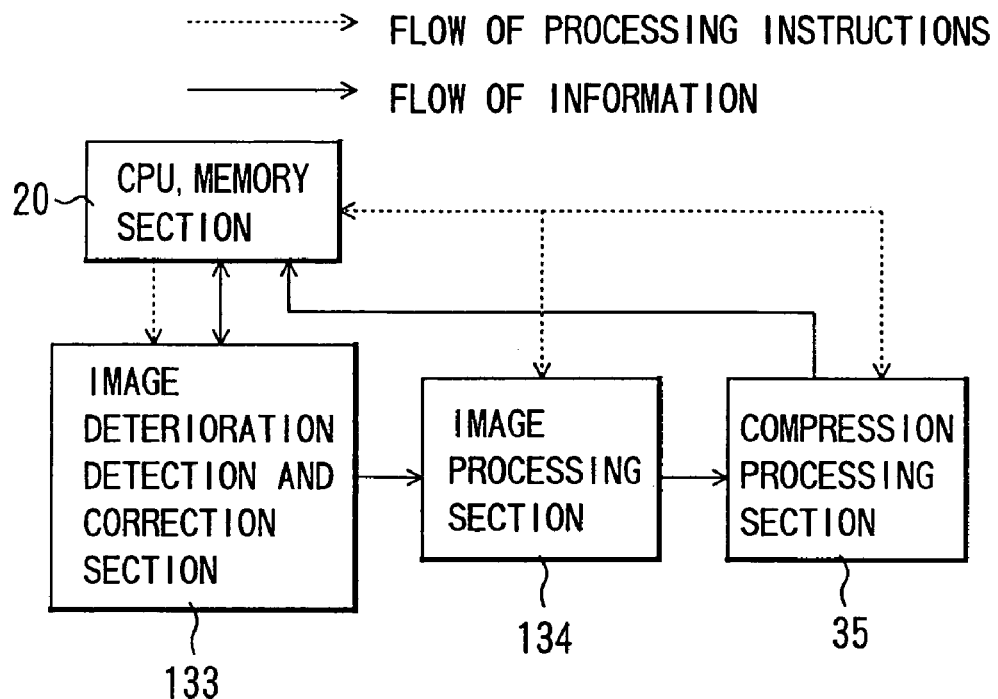
FIG. 28 is a block diagram which shows the structure of an image processing apparatus as Embodiment 4 of this invention.

Embodiment 4 of this invention is described hereunder. FIG. 28 is a system block diagram of a computer which uses an image processing apparatus that is one part of Embodiment 2. The structure other than this part is the same as Embodiment 3 shown in FIG. 20.

This computer retains in a controller 20 a W image information taken by an image-taking apparatus which has an optical system 11 having a diffractive optical element as well as information regarding the properties of the zoom state, f-number and the like of the optical system 11 at the time of image-taking and information regarding the image-forming properties of the optical system 11, and after conducting processing which makes flares resulting from unwanted diffracted light generated by the diffractive optical element of the optical system 11 visually inconspicuous in the taken image, the computer performs image processing to make the taken image into an image for appreciation, thereby providing a favorable image.

The basic structure of the computer comprises a controller 20 which issues driving instructions of the computer and stores information, an image deterioration detection and correction section 133 which estimates a generated amount of flares resulting from unwanted diffracted light and reduces the flares, an image processing section 134 which processes image information as an image for appreciation, and a compression processing section 35 which compresses the volume of image information. In the figures, arrows with a dotted line indicate the flow of processing and arrows with a solid line indicate the flow of information.

The flow of signal processing operations conducted by the computer of this embodiment is described hereunder. Image information which was previously taken by an image-taking apparatus is stored in this computer, and information regarding the lens state at the time of image-taking of each image and information regarding the image-forming properties in each lens state are also stored therein. Further, this image information is raw image information for which nonlinear processing has not been conducted with respect to brightness of information which was output from an image-pickup element of an image-taking apparatus. The color specification system of the image-taking system has a B color specification system, and the raw image information is also of a color specification which conforms thereto.

Figure 29:
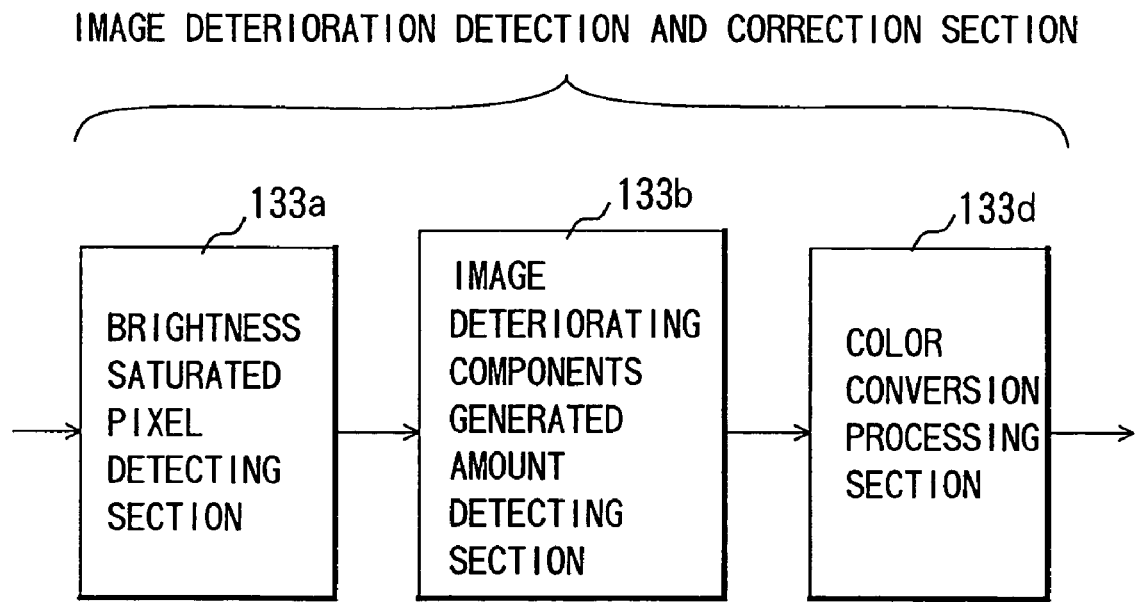
FIG. 29 is a system block diagram of an image deterioration detection and correction section in FIG. 28.

When a processing implementation instruction is entered via the user interface of the computer, the image information is transferred from the controller 20 to the image deterioration detection and correction section 133. The image deterioration detection and correction section 133 has a structure as shown in FIG. 29, and the image information is first transferred to the brightness-saturated pixel detecting section 133a.

The brightness-saturated pixel detecting section 133a detects the presence or absence of saturated pixels in the image information, and when a pixel for which image brightness is saturated in even one of the color specification systems is detected, the pixel address of that pixel is acquired as the address of a brightness-saturated pixel. After conducting the above processing for all pixels, the image brightness saturation addresses are transferred to the controller 20 and recorded therein.

Figure 30:
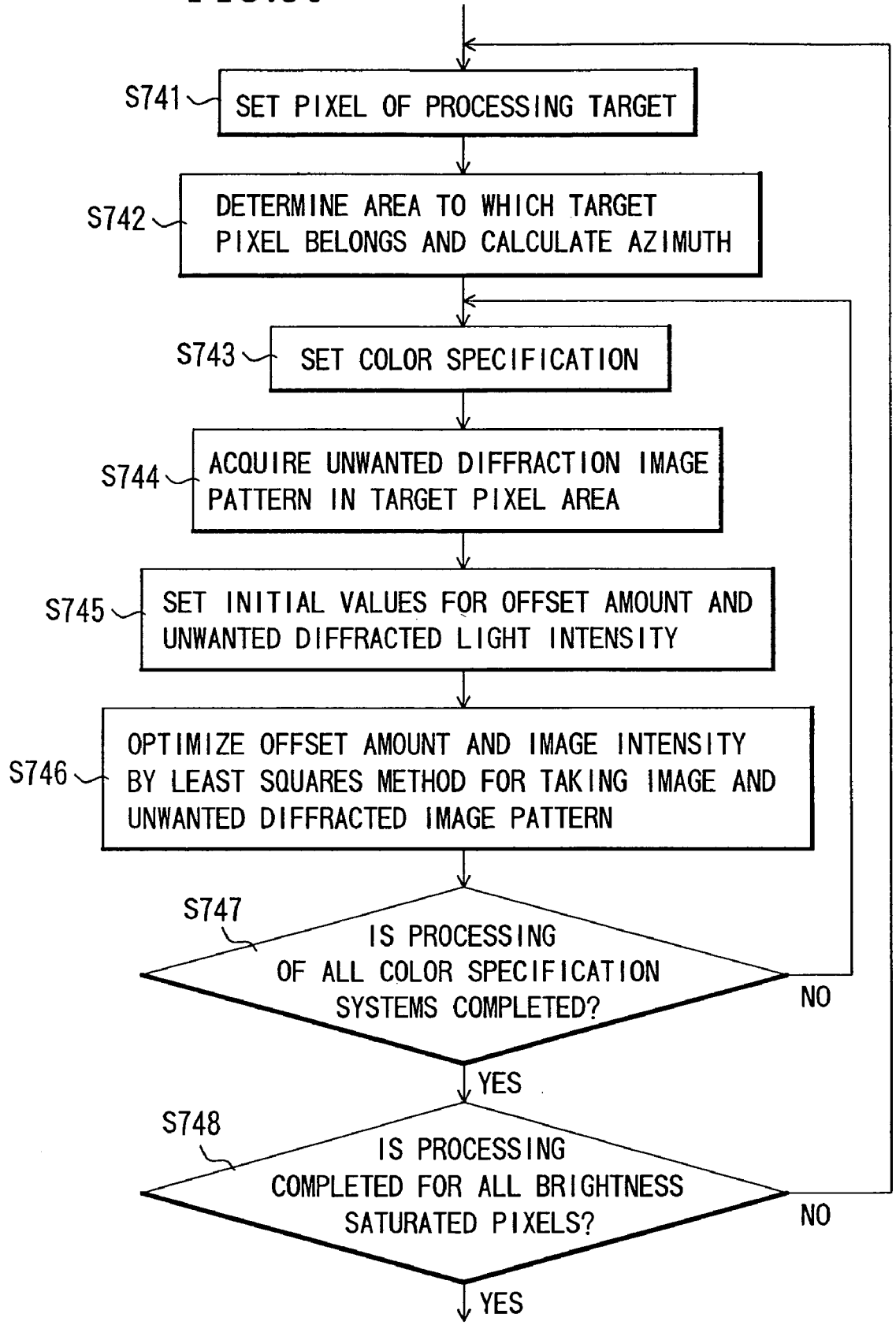
FIG. 30 is a flowchart of the image-quality deteriorating components generated amount detecting section in FIG. 29.
Figure 31:
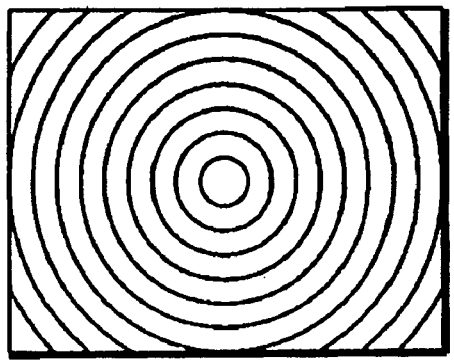
FIG. 31 is a schematic diagram of an image surface area which arranges classification of image-forming properties which result from unwanted diffraction light stored in the CPU and memory section of FIG. 28.

Image information that has conducted processing by the brightness-saturated pixel detecting section 133a is next transferred to the image-quality deteriorating components generated amount detecting section 133b. FIG. 30 shows a flowchart of processing operations to detect a generated amount of an image-quality deteriorating component conducted in the image-quality deteriorating components generated amount detecting section 133b. Similarly to Embodiment 3, this processing detects a generated amount of flare resulting from unwanted diffracted light using image information of unwanted diffracted light for each color specification system which has information regarding relative position with respect to image-forming light, and it also stores in the controller 20 alterations in the shape of each image height in the image information, such that, for example, the image surface is segmented into areas as shown in FIG. 31 and the above unwanted diffracted light image information is stored for each area. Since the optical system 11 of the image-taking system is rotationally symmetric, the unwanted diffracted light image information may be rotated in accordance with the azimuth and used.

The image-quality deteriorating components generated amount detecting section 133b first sets a brightness-saturated pixel as the processing target by referring to the information accumulated in the controller 20 and determines the area to which the target pixel belongs and calculates the azimuth. Thereafter, it acquires an unwanted diffracted light image pattern from the controller 20 for each color specification and, by the same method as Embodiment 3, acquires the optimal value for offset brightness as the background brightness and the generated amount of flare resulting from unwanted diffracted light.

After performing this processing for all color specifications and all brightness-saturated pixels, the thus-acquired generated amount of flare and offset brightness for each brightness-saturated pixel is stored in the controller 20.

Figure 32:
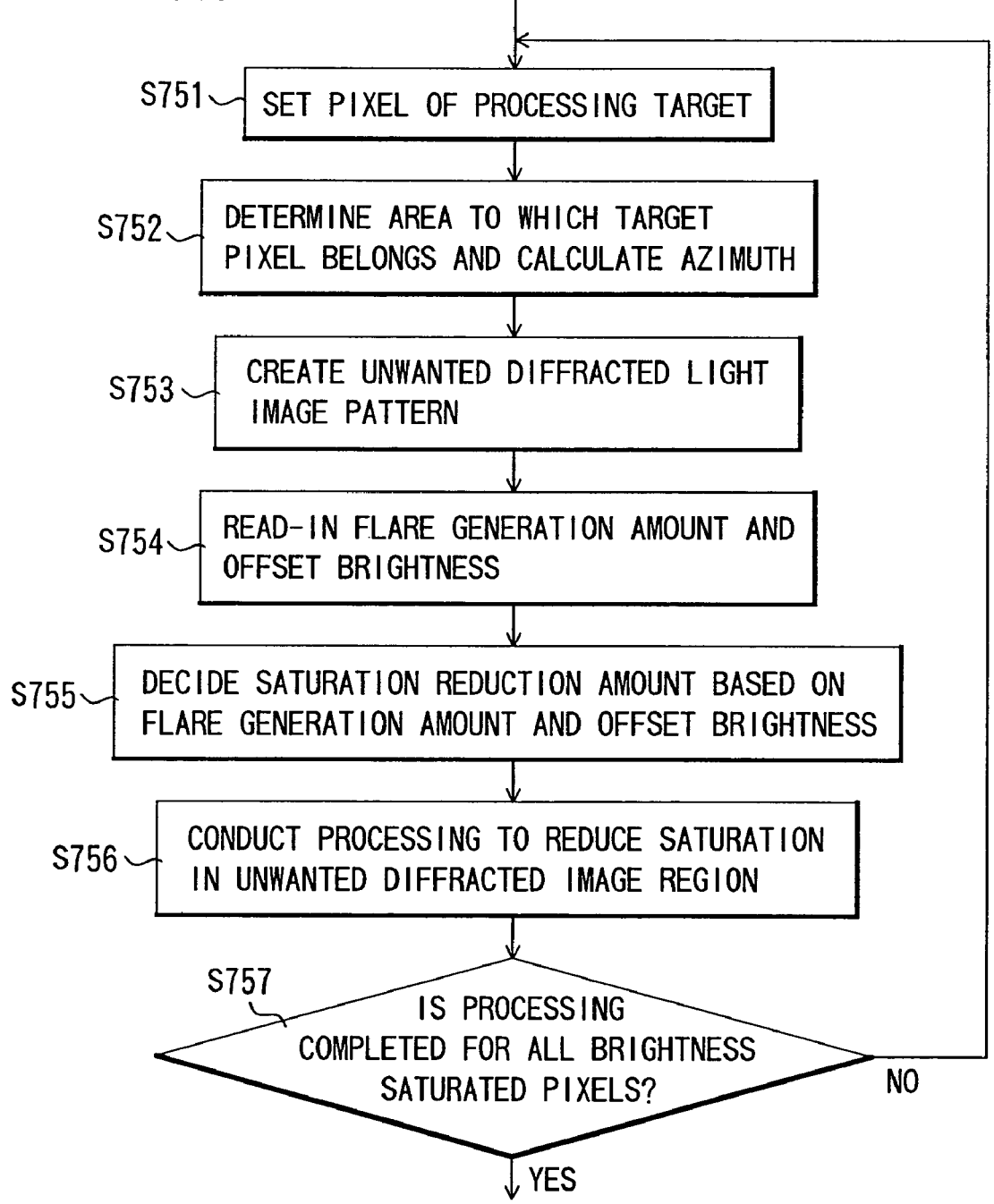
FIG. 32 is a flowchart of a color conversion processing section in FIG. 29.

The image information is transferred to the color conversion processing section 133d, in which color conversion processing to render flares visually inconspicuous is conducted with respect to regions in the image information in which unwanted diffracted light was generated. The flow of operations in this processing is shown in FIG. 32.

The color conversion processing section 133d firsts readsout a brightness saturation address which was stored in the controller 20, and from that address it calculates the area on the image surface to which the address belongs and the azimuth, and then calculates the pattern of the image of unwanted diffracted light.

Next, the color conversion processing section 133d readsout the offset amount and generated amount of flare resulting from unwanted diffracted light which were stored in the controller 20, and calculates a color difference between the B brightness of a flare component resulting from unwanted diffracted light and an offset component, that is, a color difference from the B brightness of an image in which a flare resulting from unwanted diffracted light does not exist, and changes the saturation of the region in which a flare was generated by unwanted diffracted light in accordance with the amount of that color difference. For example, if flares are generated on a red-colored object from unwanted diffracted light of a red color, the saturation change for the unwanted diffraction flare generation region is set to a small value or the saturation is not changed. If a red-colored flare is generated on a white-colored object, the saturation of the region in which the flare was generated by unwanted diffracted light is made small. After conducting the above processing for all saturated pixels the processing of the image deterioration detection and correction section 133 is completed.

Flare correction processing by color conversion for a region in which a flare was generated by unwanted diffracted light is not limited to the flow of operations described above. For example, color conversion for a region in which a flare was generated by unwanted diffracted light may be conducted such that a color difference with an object color obtained by use of an estimated offset value is minimized, or color conversion for a region in which a flare was generated by unwanted diffracted light may be conducted such that a color thereof matches a color obtained from a region bordering the boundary of a flare generated by unwanted diffracted light.

Image information which has conducted correction processing in the image deterioration detection and correction section 133 is transferred to the image processing section 134, which then conducts various kinds of image processing to produce an image which is more preferable as an image for appreciation, including brightness/color separation processing, white balance adjustment, gray balance adjustment, density adjustment color balance adjustment, and edge enhancement.

Image information that conducted image processing in the image processing section 134 is transferred to the compression processing section 135 and compressed by a predetermined method of image compression processing. The compressed image is stored in the controller 20.

By using the above-described image processing apparatus of Embodiment 4, even when an image is taken of an object which has highlights using an image-taking system which does not have a function which corrects flares resulting from unwanted diffracted light generated by a diffracting action of a diffractive optical element, the flares caused by unwanted diffracted light can be satisfactorily removed, enabling the obtainment of a favorable image which has no image deterioration.

More specifically, even when flares are generated by unwanted diffracted light in a taken image that is an image that was taken of an object which has a highlight using an image-taking apparatus which is equipped with an optical system including a diffractive optical element but which does not have a function which corrects flares resulting from unwanted diffracted light, image detection correction processing is conducted which reads the taken image into this image processing apparatus, detects the positions of pixels in which brightness was saturated, detects or estimates the generated amount of image-quality deteriorating components by employing the detected brightness-saturated pixels as reference points, and based on the generated amount, removes, reduces or makes visually inconspicuous the generated image-quality deteriorating components with respect to a region surrounding the brightness-saturated pixels. Thus, flare resulting from unwanted diffracted light can be satisfactorily eliminated to enable the obtainment of a favorable image which has little image deterioration.

While preferred embodiments have been described, it is to be understood that modification and variation of the present invention may be made without departing from the scope of the following claims.

"This application claims priorities from Japanese Patent Application Nos. 2003-373635 filed on Oct. 31, 2003 and 2003-401729 filed on Dec. 1, 2003 which are hereby incorporated by reference herein."

What is claimed is:

1. An image processing apparatus that processes image information including a first image component which was responsive to an image-forming light, and a second image component which was responsive to a non-image forming light, wherein the image processing apparatus comprises:

an image acquiring section that acquires the image information;

an edge processing section that conducts edge processing with respect to the image information, wherein the edge processing distinguishes the second image component with respect to the first image component; and a region specifying section that specifies a region of the second image component using edge image information from the edge processing, or using hue image information converted from the edge image information.

2. The image processing apparatus according to claim 1, wherein the edge processing section divides the image information into a plurality of regions and conducts edge processing which differs for each of the divided regions.

3. The image processing apparatus according to claim 1, wherein the image processing apparatus further comprises a hue conversion section which conducts processing which converts image information processed by the edge processing section into a hue value.

4. The image processing apparatus according to claim 1, wherein the image processing apparatus further comprises:

a pixel specifying section that specifies a second component pixel which is associated with the second image component, the pixel specifying section detecting brightness-saturated pixels in the image information, and specifying the second component pixel from among the detected brightness-saturated pixels by using edge image information from the edge processing section, or using hue image information converted from the edge image information; and a region specifying section which specifies a region of the second image component by employing the second component pixel as a reference.

5. The image processing apparatus according to claim 4, wherein the pixel specifying section detects a pixel for which brightness is saturated in image information of all colors of the image information of a plurality of colors as the brightness-saturated pixel.

6. The image processing apparatus according to claim 1, wherein the region specifying section specifies a region of the second image component by using the edge image information or the hue image information and information for specifying a region which is stored in a memory.

7. The image processing apparatus according to claim 1, wherein the region specifying section specifies a region of the second image component in the specified region.

8. The image processing apparatus according to claim 1, wherein the first image component is an image which corresponds to light of a specified diffraction order and the second image component is an image which corresponds to light of a diffraction order which is other than the specified diffraction order.

9. An image-taking system comprising:

an optical system comprising a diffractive surface;

a photoelectric conversion element which conducts photoelectric conversion of an optical image formed by the optical system; and the image processing apparatus according to claim 1 which processes image information acquired by using the photoelectric conversion element.

10. An image processing method that processes image information including a first image component which was responsive to an image-forming light, and a second image component which was responsive to a non-image forming light, the image processing method comprising the steps of:

acquiring the image information;

conducting edge processing with respect to the image information, wherein the edge processing distinguishes the second image component with respect to the first image component; and specifying a region of the second image component using edge image information from the edge processing section, or using hue image information converted from the edge image information.

11. An internal memory storing an image processing program that operates on an image processing apparatus and that processes image information including a first image component which was responsive to an image-forming light~ and a second image component which was responsive to a non-image forming light, the image processing program comprising the steps of: acquiring the image information; conducting edge processing with respect to the image information, wherein the edge processing distinguishes the second image component with respect to the first image component, and specifying a region of the second image component using edge image information from the edge processing section, or using hue image information converted from the edge image information.

12. An image processing apparatus that processes image information including a first image component which was responsive to an image-forming light, and a second image component which was responsive to a non-image forming light, wherein the image processing apparatus comprises:

an image acquiring section that acquires the image information;

an edge processing section that conducts edge processing with respect to the image information, wherein the edge processing distinguishes the second image component with respect to the first image component;

a pixel specifying section that specifies a second component pixel which is associated with the second image component, the pixel specifying section detecting brightness-saturated pixels in the image information, and specifying the second component pixel from among the detected brightness-saturated pixels by using edge image information from the edge processing section, or using hue image information converted from the edge image information; and a region specifying section which specifies a region of the second image component by employing the second component pixel as a reference.

13. The image processing apparatus according to 12, wherein the pixel specifying section detects a pixel for which brightness is saturated in image information of all colors of the image information of a plurality of colors as the brightness-saturated pixel.

14. The image processing apparatus according to claim 12, wherein the region specifying section specifies a region of the second image component by using the edge image information or the hue image information and information for specifying a region which is stored in a memory.

15. The image processing apparatus according to claim 12, wherein the image processing apparatus further has a correcting section which conducts processing which reduces visibility of the second image component in the specified region.

* * * * *